US005555353A

United States Patent [19]

Shibazaki

[11] Patent Number: 5,555,353

[45] Date of Patent: Sep. 10, 1996

[54] METHOD OF AND APPARATUS FOR PRODUCING SHADOWED IMAGES

[75] Inventor: Hiroshi Shibazaki, Kyoto, Japan

[73] Assignee: Dainippon Screen Manufacturing Co., Ltd., Japan

[21] Appl. No.: 96,922

[22] Filed: Jul. 23, 1993

[30] Foreign Application Priority Data

Aug. 6, 1992 [JP] Japan .................................... 4-232965

[51] Int. Cl.$^{6}$ .................................................. G06T 15/50

[52] U.S. Cl. .......................... 395/126; 395/138; 395/151; 345/139

[58] Field of Search .................................... 395/126, 138, 395/150, 151; 345/139

[56] References Cited

U.S. PATENT DOCUMENTS 5,255,353 10/1993 Itoh ........................................ 395/126

*Primary Examiner*—Mark K. Zimmerman

*Attorney, Agent, or Firm*—Ostrolenk, Faber, Gerb & Soffen, LLP

[57] ABSTRACT

A shadowing process in which offset values Δx and Δy indicating a gradient and a range of the shadowing effect are set as shadowing parameters. A target linework image area G is extracted from original image data on an n-th scanning line. On the next (n+1)-th line, a shadow pixel S1 is obtained for a start pixel GO of the target linework image area G according to a gradient k calculated by the offset values Δx and Δy. A shadow line segment on the (n+1)-th scanning line is determined based on the shadow pixel S1 and a length L of the target linework image area G. Shadow line segments are determined for (n+2)-th and (n+3)-th scanning lines in the same manner. The shadow line segments are combined to make a shadow area S.

11 Claims, 25 Drawing Sheets

Fig. 1A
(PRIOR ART)
Fig. 1B
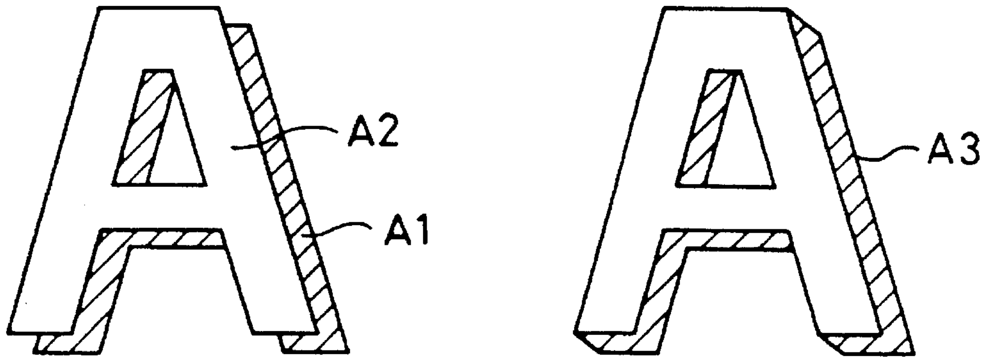
Fig. 2
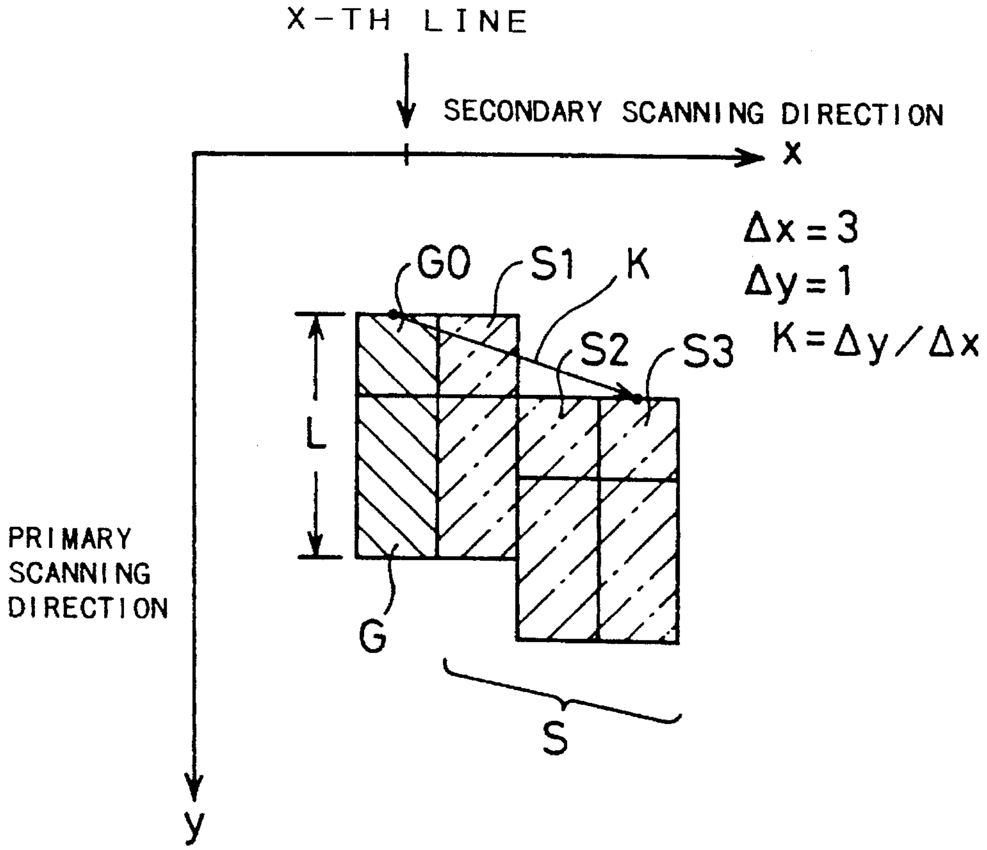

Fig. 4
8
| COLOR NUMBER Nc | Hy | Hm | Hc | Hk |
|---|---|---|---|---|
| 10 | 0 | 0 | 0 | 0 |
| 11 | 100 | 100 | 0 | 0 |
| 12 | 0 | 100 | 100 | 0 |
| | | | | |
| | | | | |
Fig. 6
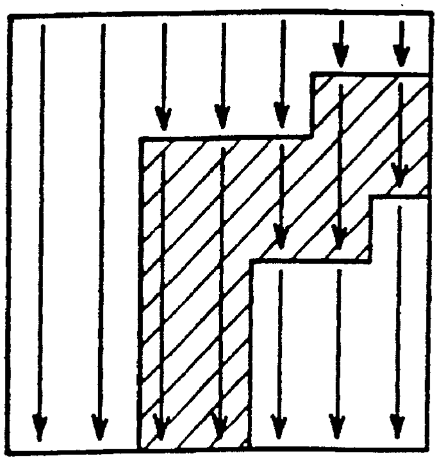
Fig. 7
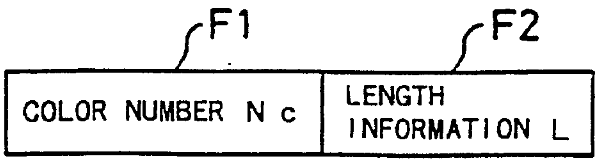

Fig. 9
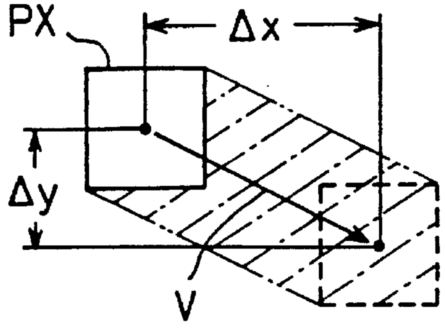
Fig. 10A
Fig. 10B
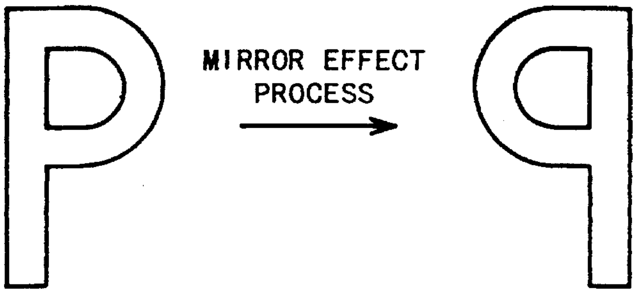
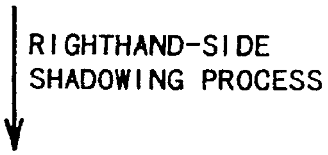
Fig. 10D
Fig. 10C
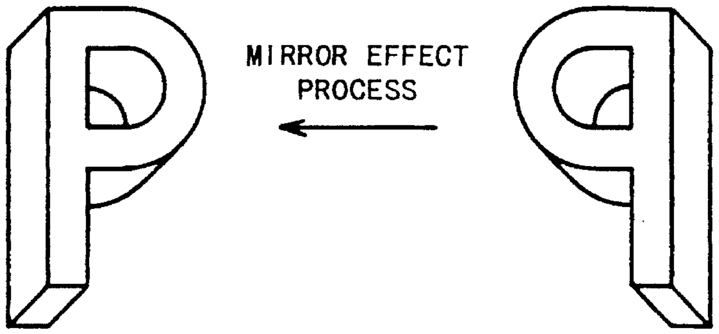

| n | (A) SHADOWING LINE INFORMATION AT STEP S360 TX [LX] / NT | (B) ORIGINAL LINEWORK IMAGE DATA DR AT STEP S330 TX [LX] | (C) SHADOWING LINE INFORMATION AT STEP S340 TX [LX] / NT | (D) SHADOWING DATA AT STEP S350 TX [LX] |
|---|---|---|---|---|
| 3 | — | 2(6) | 2.000(6.000)/0 | 2(6) |
| 4 | 2.333(6.000)/1 | 5(3) | 2.333(2.667)/1<br>5.000(3.000)/0<br>8.000(0.333)/1 | 2(6) |
| 5 | 2.667(2.667)/2<br>5.333(3.000)/1<br>8.333(0.333)/2 | 3(7) | 2.667(0.333)/2<br>3.000(7.000)/0 | 3(7) |
| 6 | 3.000(0.333)/3<br>3.333(7.000)/1 | — | 3.000(0.333)/3<br>3.333(7.000)/1 | 3(7) |
| 7 | 3.667(7.000)/2 | — | 3.667(7.000)/2 | 4(7) |
| 8 | 4.000(7.000)/3 | — | 4.000(7.000)/3 | 4(7) |
| 9 | — | — | — | — |

|  | Fd EFFECTIVE DATA NUMBER Ne | Fc Fa START POSITION | Fb |
|---|---|---|---|
| RECORD 1 | OPERATION NUMBER NT 1 | START POSITION TX 1 | LENGTH LX 3 |
| 2 | OPERATION NUMBER NT 2 | START POSITION TX 2 | LENGTH LX 2 |
| 3 | OPERATION NUMBER NT 3 | START POSITION TX 3 | LENGTH LX 3 |
| 4 | OPERATION NUMBER NT 4 | START POSITION TX 4 | LENGTH LX 4 |
| | ------ | ----- | ----- |

SHADOWING LINE INFORMATION

[−1.0 ≦ k ≦ 1.0 ···· (2)]

[k<1.0 or 1.0<k ····(3)]

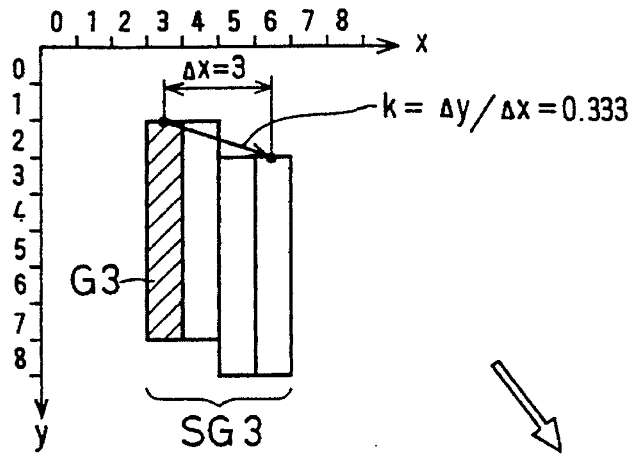
Fig. 21A
Fig. 21B
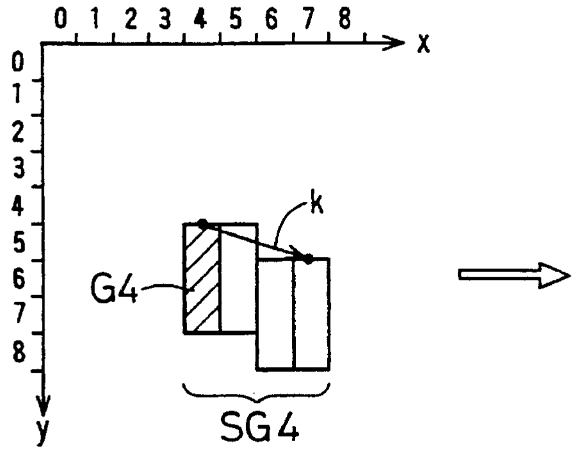
Fig. 21C
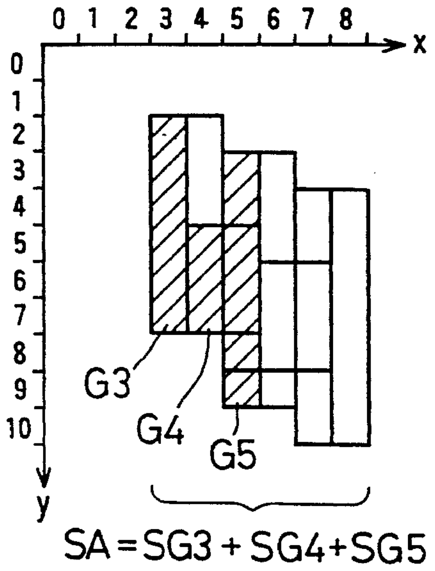
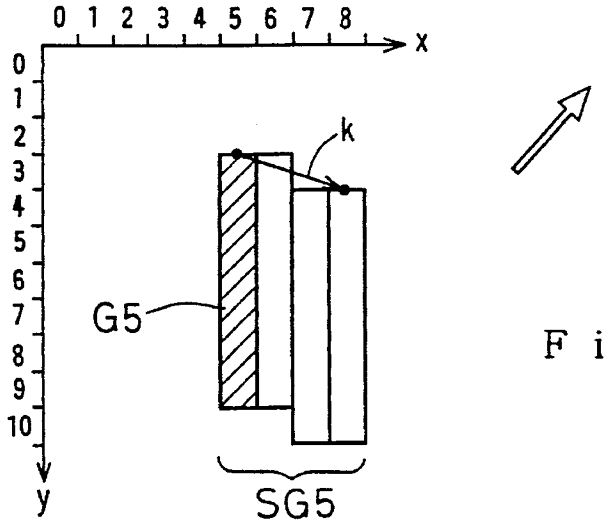
Fig. 21D

| n | (A) SHADOWING LINE INFORMATION AT STEP S360 TX[LX]/NT | (B) ORIGINAL LINEWORK IMAGE DATA AT STEP S330 TX[LX] | (C) SHADOWING LINE INFORMATION AT STEP S340 TX[LX]/NT | (D) SHADOWING DATA AT STEP S350 TX[LX] |
|---|---|---|---|---|
| 1 | — | 1[1] | 1.0[1.0]/0 | 1[2] |
| 2 | 4.5[1.0]/1 | — | 4.5[1.0]/1 | 3[4] |
| 3 | 8.0[1.0]/2 | — | 8.0[1.0]/2 | 7[2] |
| 4 | — | — | — | — |

$\Delta x=2$, $\Delta y=7$ $k=\Delta y/\Delta x=3.5$

F i g . 2 7
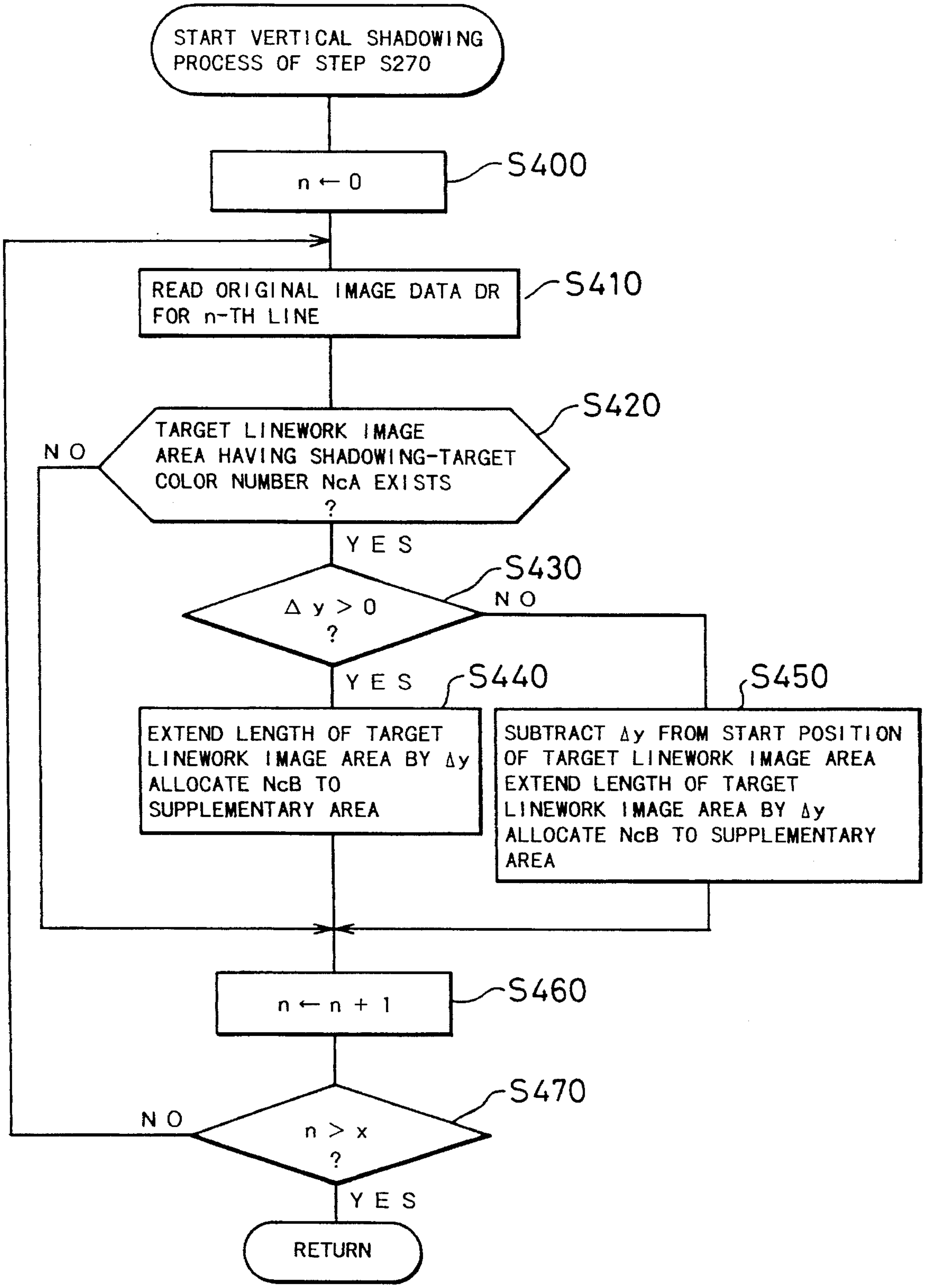

METHOD OF AND APPARATUS FOR PRODUCING SHADOWED IMAGES

BACKGROUND OF THE INVENTION

1. Field of the Invention

The present invention relates to a method of and an apparatus for processing linework image data representing a linework image to produce a supplementary area adjacent to the linework image.

2. Description of the Related Art

Shadowing in image processing is a technique to add a shadow area to linework images such as characters and illustrations to increase their visual impact. A conventional shadowing process shifts a target linework image in parallel by a small distance to form a supplementary area adjacent to the target linework image. The supplementary area is then shaded or colored to make the shadow area. FIG. 1A shows a linework image accompanying a shadow area formed by the conventional process. As shown in FIG. 1A, a shadowed linework image includes an original linework area A2 and a shadow area A1. The original linework area A2 is always laid over the shadow area A1 to make the shadow area A1 seem to be a real shadow.

Since the conventional shadowing process simply forms a shadow area by the parallel movement of the target linework image, the shadow area cannot give a three-dimensional effect such as that shown in FIG. 1B. There are presently no methods and apparatus available for forming a supplementary area A3 such as shown in FIG. 1B. Once formed, the supplementary area A3 can be easily shaded or colored to make a shadow area giving a three-dimensional effect.

SUMMARY OF THE INVENTION

An object of the present invention is to provide a method and an apparatus for forming a supplementary area adjacent to a linework image, which can be shaded to make a shadow area having an improved three-dimensional effect.

The present invention is directed to a method of processing image data representing a target linework image area to thereby produce a supplementary area to the linework image area, comprising the steps of: (a) preparing image data, stored in a first memory, representing a target linework image area with respect to each scanning line in a primary scanning direction, the target linework image area having a specified predetermined color; (b) specifying shift parameters indicating a gradient of a shift of the target linework image area and a range of the shift in a secondary scanning direction; (c) successively reading out a set of the image data from the first memory in order of a secondary scanning coordinate of each primary scanning line, the set of the image data representing a linework image on a target primary scanning line; and (d) shifting a target line segment represented by the set of the image data according to the shift parameters to thereby produce supplementary area data representing a supplementary area for the target line segment, the target line segment having the predetermined color, the supplementary area including a supplementary line segment on each of primary scanning lines which are within the range of the shift from the target primary scanning line.

In the preferred embodiment, the method further comprises the step of: (e) applying color data to the supplementary area data to fill the supplementary area with a color different from the predetermined color of the target image area.

According to an aspect of the present invention, the image data and the supplementary area data are run length data including a start position of a line segment and a length of the line segment; the step (c) comprises the step of: (c-1) memorizing the set of the image data read out from the first memory in a second memory; and the step (d) comprises the step of: (d-1) obtaining a start position of the supplementary line segment on each of the primary scanning lines from a start position of the target line segment as a function of the gradient of the shift, and updating the set of the image data memorized in the second memory with the start position of the supplementary line segment.

Preferably, the step (c) further comprises the step of: (c-2) memorizing an ordinal number of the set of image data, the ordinal number being set at a predetermined initial value when the set of the image data is memorized in the second memory; and (c-3) increasing the ordinal number by one every time another set of the image data of a next primary scanning line is read out from the first memory; and the step (d) further comprises the step of: (d-2) comparing the ordinal number of the set of the image data at each of the primary scanning lines, thereby eliminating the set of the image data from the second memory when the ordinal number is greater than a sum of the initial value and the range of the shift.

The step (d) further comprises the step of: (d-3) extending the supplementary line segment along the primary scanning line to thereby make the supplementary area in contact with the target linework image area.

The step (d) further comprises the step of: (d-4) combining a plurality of supplementary line segments existing on each primary scanning line, each of the plurality of supplementary line segments being obtained for respective target line segments.

According to another aspect of the present invention, the step (d) further comprises the step of: (f) extending the target line segment in the primary scanning direction when the range of the shift is equal to zero, to thereby produce the supplementary line segment.

According to still another aspect of the present invention, the step (d) further comprises the step of: (g) inverting the target linework image area to make a mirror image of the target linework image area when the range of the shift is less than zero.

According to another aspect of the present invention, the step (c) further comprises the step of: (h) reading out the unit of the image data from the first memory in inverted order of the secondary scanning coordinate of each primary scanning line when the range of the shift is less than zero.

The present invention is also directed to an image processing apparatus for processing image data representing a target linework image area to thereby produce a supplementary area to the linework image area, comprising: a first memory for storing image data representing a target linework image area with respect to each scanning line in a primary scanning direction, the target linework image area having a specified predetermined color; parameter input means for specifying shift parameters indicating a gradient of a shift of the target linework area and a range of the shift in a secondary scanning direction; image data reading means for successively reading out a set of the image data from the first memory in order of a secondary scanning coordinate of each primary scanning line, the set of the image data representing a linework image on a target primary scanning line; and supplementary area production means for shifting a target line segment represented by the set of the image data according to the shift parameters to thereby produce supplementary area data representing a supplementary area for the target line segment, the target line segment having the predetermined color, the supplementary area including a supplementary line segment on each of primary scanning lines which are within the range of the shift from the target primary scanning line.

The present invention is further directed to a method of processing linework image data representing a target linework image area to thereby produce a supplementary area to the linework image area, comprising the steps of: (a) preparing run length data, stored in a first memory, representing a target linework image area with respect to each scanning line in a primary scanning direction, the target linework image area having a specified predetermined color; (b) specifying shift parameters indicating a gradient of a shift of the target linework image area and a range of the shift in a secondary scanning direction; (c) selecting a target primary scanning line to be processed in order of a secondary scanning coordinate of each primary scanning line; (d) reading out a set of the run length data from the first memory, the set of the run length data representing a linework image on the target primary scanning line; (e) extracting effective run length data from the set of the run length data, the effective run length data representing a target line segment having the predetermined color; (f) registering the effective run length data in a second memory, each data record of the effective run length data including a start position and a length of the target line segment and an ordinal number for the data record, the ordinal number being set at an initial value when the effective run length data is memorized in the second memory; (g) producing supplementary line data representing a supplementary line segment on the target primary scanning line by substantially rounding values of each data record in the effective run length data; (h) adding the gradient of the shift to the start position of each data record of the effective run length data, and increasing the ordinal number of each data record by one, whereby the target line segment is virtually shifted to a next primary scanning line according to the gradient; (i) eliminating a data record having the ordinal number greater than a sum of the initial value and the range of the shift from the second memory; and (j) repeating the steps (c) through (i) to thereby produce supplementary area data representing the supplementary area including a plurality of the supplementary line segments.

In the preferred embodiment, the step (g) comprises the steps of: (g-1) finding an end position indicated by the start position and the run length of each data record of the effective run length data; (g-2) rounding values of the start position and the end position for each data record of the effective run length data; and (g-2) producing the supplementary line data representing the supplementary line segment, the supplementary line segment ranging from the rounded start position to the rounded end position.

Other features and advantages of the present invention will become apparent from the following description of the invention which refers to the accompanying drawings.

BRIEF DESCRIPTION OF THE DRAWINGS

FIG. 1A illustrates a shadowed image generated by a conventional shadowing process;

FIG. 1B illustrates a shadowed image having a desirable three-dimensional effect;

FIG. 2 schematically illustrates a basic idea of the present invention;

FIG. 4 shows the contents of a color number table;

FIG. 6 shows a concept of run length data;

FIG. 7 shows constituents of each run length data;

FIG. 9 shows offset values Δx and Δy;

FIGS. 10A through 10D show the procedure of lefthand-side shadowing process;

FIG. 21 illustrates another way of explaining the righthand-side shadowing process;

FIG. 27 is a flowchart showing details of the vertical shadowing process executed at step S270 of the flowchart of FIG. 8.

DETAILED DESCRIPTION OF EMBODIMENTS OF THE INVENTION

A. Introduction

FIG. 2 schematically illustrates certain introductory ideas of the present invention. There are two shadowing parameters used in the shadowing process of FIG. 2: a first offset $\Delta x=3$ in the secondary scanning direction, and a second offset $\Delta y=1$ in the primary scanning direction. An original line segment G is expressed by run length data including a start position of the first pixel GO and a length L of the original line segment G.

The offset values $\Delta x$ and $\Delta y$ indicate a gradient $k=\Delta y/\Delta x$, with which the original line segment G is shifted as shown in FIG. 2. The offset value $\Delta x$ indicates the number of scanning lines on which shadow line segments are produced from the original line segment G.

More concretely, the start position of each shadow line segment S1, S2, or S3 on each scanning line is obtained by shifting the start pixel GO of the target linework image area G according to the gradient k. The start position of each shadow line segment is, however, rounded to an integral value because an image part expressed by decimal part of figures cannot be reproduced. Each shadow line segment holds the length L of the original line segment G. A composite shadow area S is a sum of the shadow line segments S1 through S3.

Since the original image data representing the target linework image area G is constructed as run length data, the composite shadow area S is easily produced through changing the run length data as a function of the shadowing parameters.

B. Structure of an Apparatus

Figure 3:
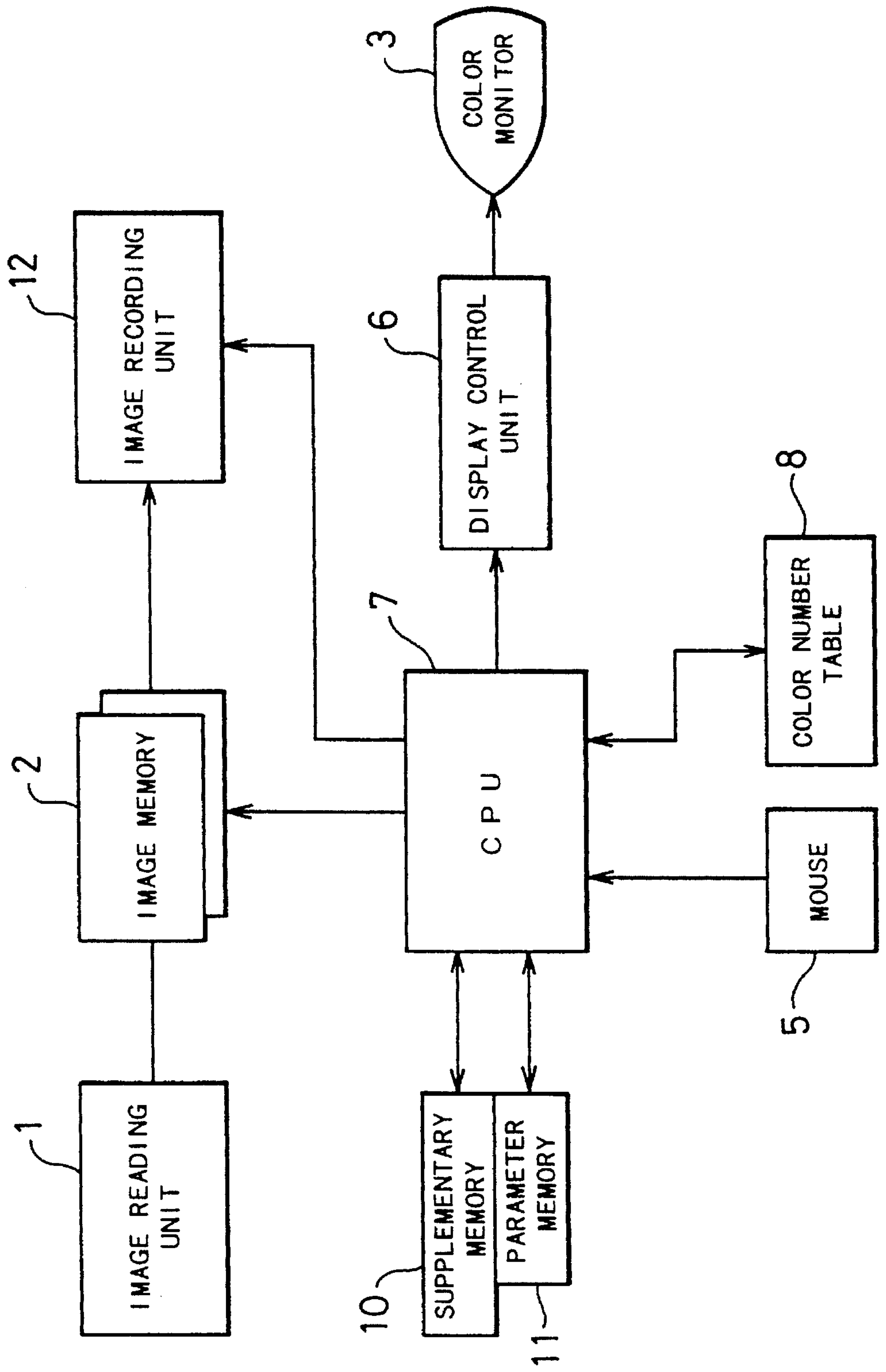
FIG. 3 is a block diagram schematically showing the structure of an image processing apparatus for shadowing an image according to an embodiment of the invention.

FIG. 3 is a block diagram schematically showing structure of an image processing apparatus for shadowing a linework image according to an embodiment of the present invention. The image processing apparatus includes the following elements:

(a) Image reading unit 1 such as a flat bed scanner for scanning a linework image of an original to capture binary image data representing the linework image, and converting the binary image data to run length data.

(b) Image memory 2 for storing run length data representing a target linework image. A CPU 7 executes various process steps such as shadowing, coloring, and mirror processing on the run length data stored in the image memory 2. These process steps generally require a source data area to store run length data which is to be processed and a destination data area to store another run length data obtained by the process step. The image memory 2 thus has sufficient capacity to store at least twice the run length data output from the image reading unit 1.

(c) Color monitor 3 for displaying a target linework image and a resultant linework image after the shadowing process.

(d) Mouse 5 for selecting a target linework image out of plural linework images in an image displayed on the color monitor 3.

(e) Display control unit 6 for controlling display of an image on the color monitor 3 and shifting a cursor on the color monitor 3 responsive to movement of the mouse 5.

(f) CPU 7 for executing various process steps such as shadowing, coloring, and mirror processing. CPU 7 also executes skipping on the run length data stored in the image memory 2 and converts the skipped run length data into bit map data. The bit map data is transferred to the display control unit 6 to display a linework image on the color monitor 3. CPU 7 starts the various process steps responsive to instructions given by an operator with the mouse 5.

(g) Color number table 8 for storing halftone dot area rates for four color printing plates Y(yellow), M(magenta), C(cyan), and K(black), respectively, for each color number Nc. FIG. 4 shows the contents of the color number table 8. The combination of the halftone dot area rates (Hy, Hm, Hc, Hk) for the color number Nc=# is expressed by:

Nc[#]=(Hy, Hm, Hc, Hk) where Hy, Hm, Hc, and Hk denote halftone dot area rates for yellow, magenta, cyan, and black, respectively. The combination of the halftone dot area rates for the color numbers of 10, 11, and 12 are expressed as follows:

Nc[10]=( 0, 0, 0, 0)

Nc[11]=( 100, 100, 0, 0)

Nc[12]=( 0, 100, 100, 0)

(h) Supplementary memory 10 for storing temporary information required in each process step, such as shadowing line information used in the shadowing process, which will be described later in detail.

(i) Parameter memory 11 for storing parameters of the shadowing process specified by an operator as well as dimensions of an original given by the image reading unit 1.

(j) Image recording unit 12 for recording an image on a recording medium such as a photosensitive film.

C. Process Steps

C-1 Image Processing Routine

Figure 5:
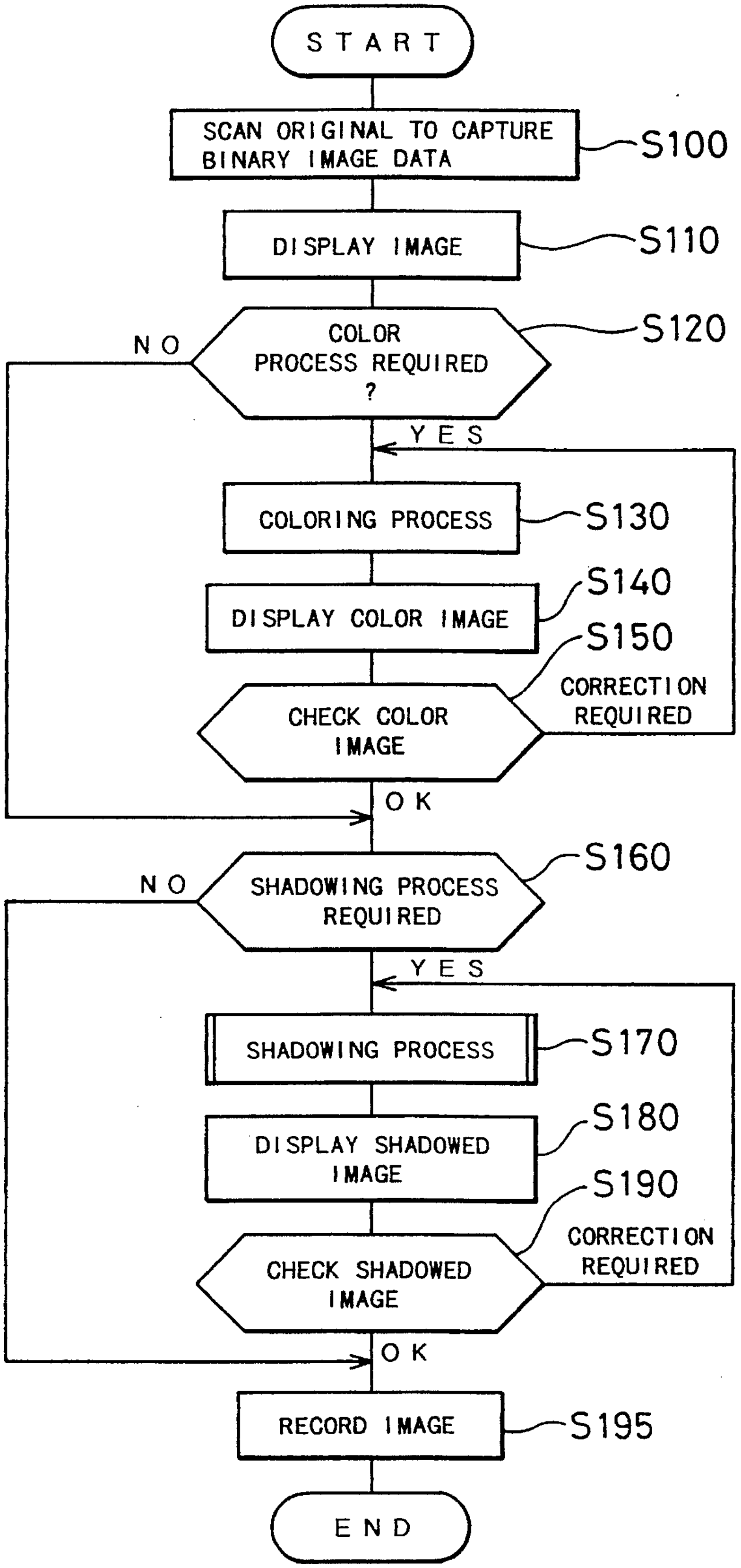
FIG. 5 is a flowchart showing an image processing routine.

FIG. 5 is a flowchart showing the procedure of image processing routine including the shadowing process.

At step S100, the image reading unit 1 scans a linework image of an original including a character or illustration to capture binary image data representing the linework image. The binary image data is then converted to run length data and transferred to the image memory 2. The binary image data which is previously stored in an external memory unit (not shown) can be used instead of capturing the binary image data at step S100.

FIG. 6 schematically illustrates run length data. Each unit of the run length data, which is expressed by an arrow in FIG. 6, represents a series of pixels which have an identical color number on the same primary scanning line. The shaded area in FIG. 6 has a color number of one while the non-shaded areas have a color number of zero, for example. Each unit of the run length data includes a color number field F1 for storing a color number Nc and a length information field F2 for storing length information L indicating the number of pixels in the run. The color number Nc is set at zero for white runs and at one for black runs. At this initial stage, the combination of the halftone dot area rates for the four colors (Hy, Hm, Hc, Hk) is set at (0, 0, 0, 0) for the color number of zero and (0, 0, 0, 100) for the color number of one, accordingly.

At step S110, the CPU 7 executes skipping of the run length data and develops the skipped run length data into bit map image data. The bit map image data represents a linework image which has the right size to be displayed on the color monitor 3. The bit map image data is transferred to the display control unit 6 to display the linework image on the color monitor 3. The displayed linework image is black and white at this stage.

At step S120, an operator instructs whether or not a coloring process is to be executed for the black and white linework image displayed on the color monitor 3. When the answer is YES at step S120, the program goes to step S130 at which a coloring process is executed for the linework image. In the coloring process, the operator selects at least one image area in the linework image and allocates a desired color number Nc to each image area selected. The CPU 7 executes a filling process step to color the selected image area with the allocated color, thereby registering the color number in the color number field F1 of the run length data representing the selected image area.

At step S140, the CPU 7 converts the run length data to bit map data and displays a color image on the color monitor 3 as a function of the bit map data. Before transferring the bit map data to the display control unit 6, the CPU 7 refers to the color number table 8 to find the combination of the dot percents corresponding to each color number Nc in the color number field F1 of the run length data, and then transfers the dot percent combination together with the bit map data. The display control unit 6 converts the bit map data to color signals of red (R), green (G), and blue (B) to compose a color image on the color monitor 3.

At step S150, the operator checks the color image displayed on the color monitor 3 to determine whether the colored image is satisfactory. The operator clicks an icon of either 'OK' or 'Correction required' with the mouse 5. When the operator selects 'Correction required', the program returns to step S130 to repeat steps S130 through S150 for performing the coloring process and the image display again.

When the operator clicks 'OK' at step S150, or when the answer is NO at step S120, the program proceeds to step S160 at which the operator instructs whether shadowing process is required for the linework image. When the answer is YES at step S160, the program goes to step S170 at which shadowing process is executed for the run length data stored in the image memory 2. The shadowing process will be described later in detail.

After the shadowing process, a shadowed linework image is displayed on the color monitor 3 at step S180. In this step, the CPU 7 converts the run length data with the shadow effect stored in the image memory 2 to bit map data, and transfers the bit map data along with the dot-percent combination to the display control unit 6, thereby displaying a shadowed linework image on the color monitor 3.

At step S190, the operator checks the shadowed color image displayed on the color monitor 3 to determine whether the shadow effect is satisfactory. The operator clicks an icon of either 'OK' or 'Correction required' with the mouse 5. When the operator selects 'Correction required', the program returns to step S170 to repeat steps S170 through S190 for performing the shadowing process and the image display again.

When the operator clicks 'OK' or when the answer is NO at step S160, the program proceeds to step S195 at which the image recording unit 12 records a resultant image after the coloring process and/or the shadowing process as a halftone film or a printing plate.

C-2 Details of the Shadowing Process

Figure 8:
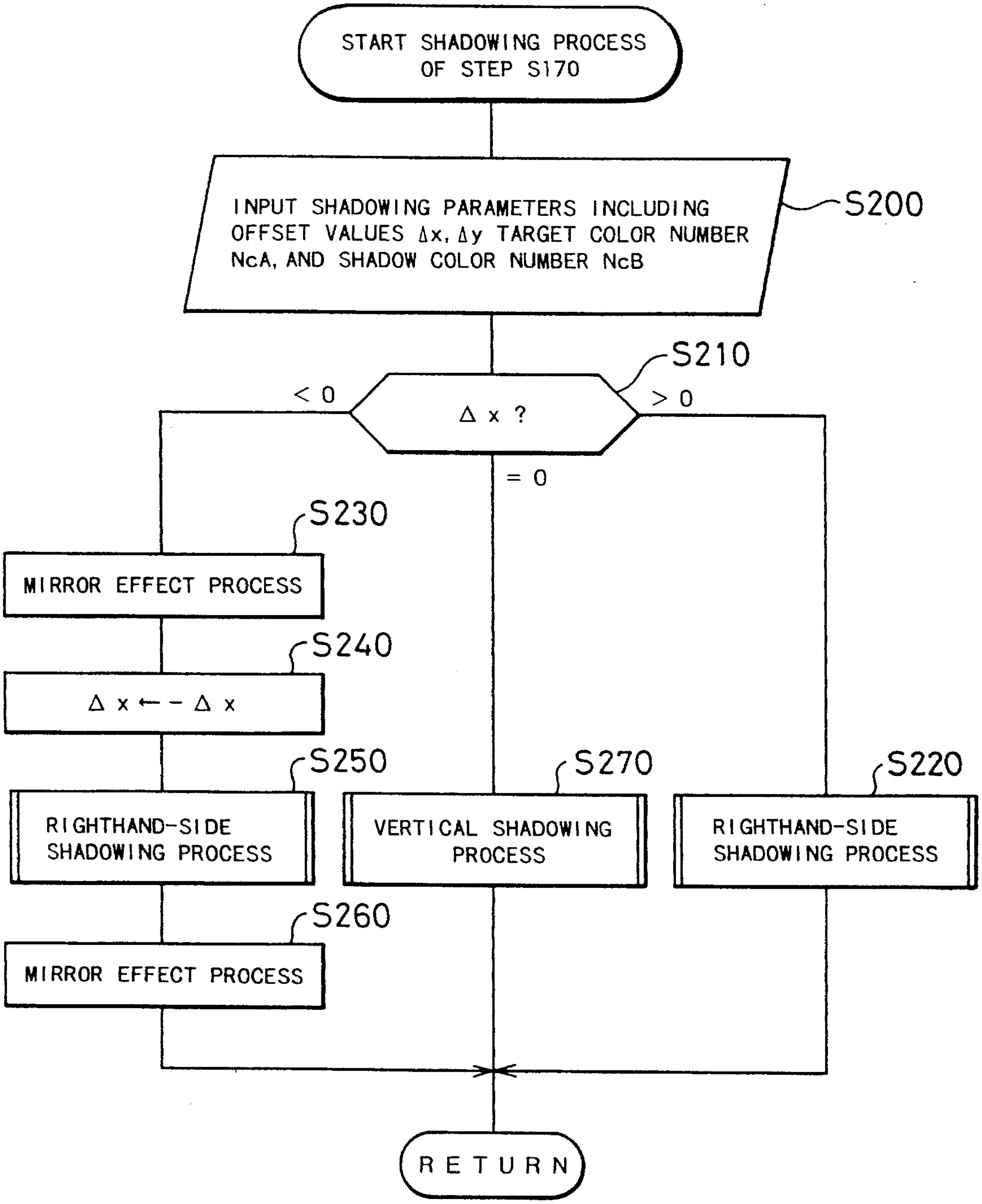
FIG. 8 is a flowchart showing details of the shadowing process executed at step S170 of the flowchart of FIG. 5.

FIG. 8 is a flowchart showing the detailed procedure of the shadowing process at step S170.

When the shadowing process starts at step S170, the operator specifies a plurality of parameters required for the shadowing process with the mouse 5. The parameters include:

(1) Offset values Δx and Δy in a secondary scanning direction and a primary scanning direction, respectively, which define the direction and the range of the shadowing effect;

(2) Target color number NcA to specify a target image area to be processed in the shadowing process; and (3) Shadow color number NcB indicating a color with which a supplementary area, or a shadow area, is to be filled.

These parameters are stored in the parameter memory 11.

FIG. 9 schematically illustrates the offset values Δx and Δy. In the first stage of the shadowing process described later, a specific pixel PX is shifted as shown with an arrow V to form a supplementary area, which is shaded in FIG. 9. The offset values Δx and Δy denote the distances of the shift in the secondary scanning direction and the primary scanning direction, respectively.

At step S210, the offset value Δx is compared with zero. When the offset value Δx is greater than zero, the program goes to step S220. At step S220, a righthand-side shadowing process (described later) is executed to form a shadow area at the righthand side of the target linework area, which is specified by the target color number NcA. The righthand side means the side in which a secondary-scanning coordinate increases. After completion of the righthand-side shadowing process at step S220, the program returns to step S180 of the flowchart of FIG. 5.

When the offset value Δx is smaller than zero at step S210, a lefthand-side shadowing process is executed according to the following steps.

At step S230, mirror effect process is executed to form a mirror image of the target linework area as shown in FIGS. 10A and 10B. The mirror effect process requires the source to destination processing where the run length data representing the target linework area stored in the image memory 2 are copied from a source memory plane to a destination memory plane while the image is reversed.

At the following step S240, the sign of the offset value Δx is reversed to be positive. At step S250, the righthand-side shadowing process, which is the same as that of step S220, is executed for the mirror image of the target linework area as shown in FIG. 10C.

The program then goes to step S260 at which the mirror effect process is executed in the same manner as step S230, thereby forming a re-inverted image with a shadow area as shown in FIG. 10D. The program then exits from the shadowing process routine and returns to step S180 of the flowchart of FIG. 5.

When the offset value Ax is equal to zero at step S210, the program goes to step S270 for executing the vertical shadowing process. In this case, the other offset value Δy cannot be zero because the shadowing process is not executed in the first place if both Δx and Δy are zero. The vertical shadowing process forms a shadow area under or over the target image area, that is, in a primary scanning direction. More concretely, the vertical shadowing process is executed for the target linework area specified by the target color number NcA. After completion of the vertical shadowing process at step S270, the program exits from the shadowing process routine and returns to step S180 of the flowchart of FIG. 5.

C-3 Details of the Righthand-side Shadowing Process

Figure 11A:
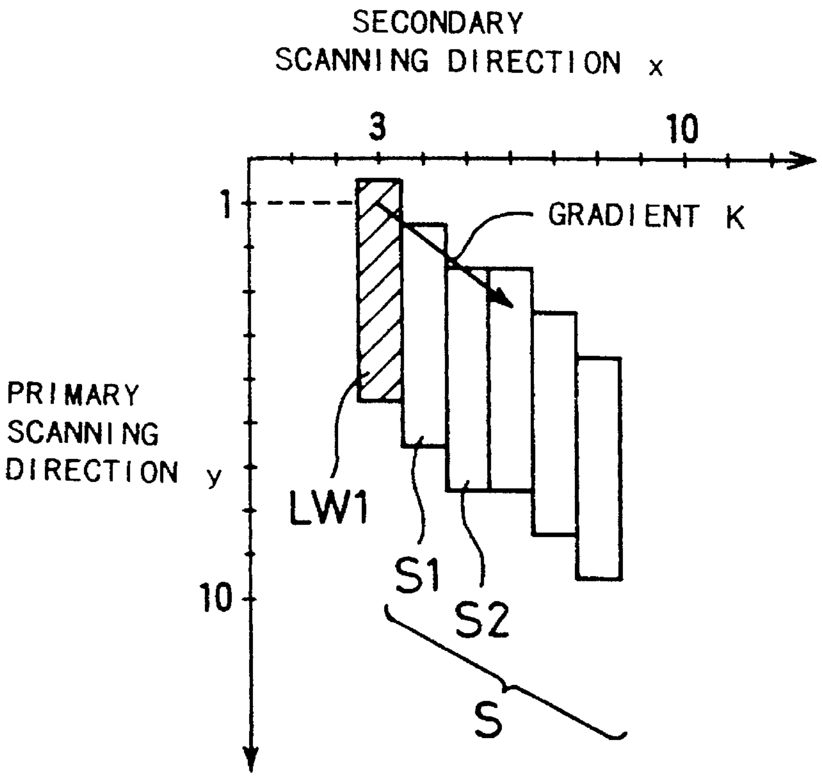
FIGS. 11A and 11B show the procedure of righthand-side shadowing process.
Figure 11B:
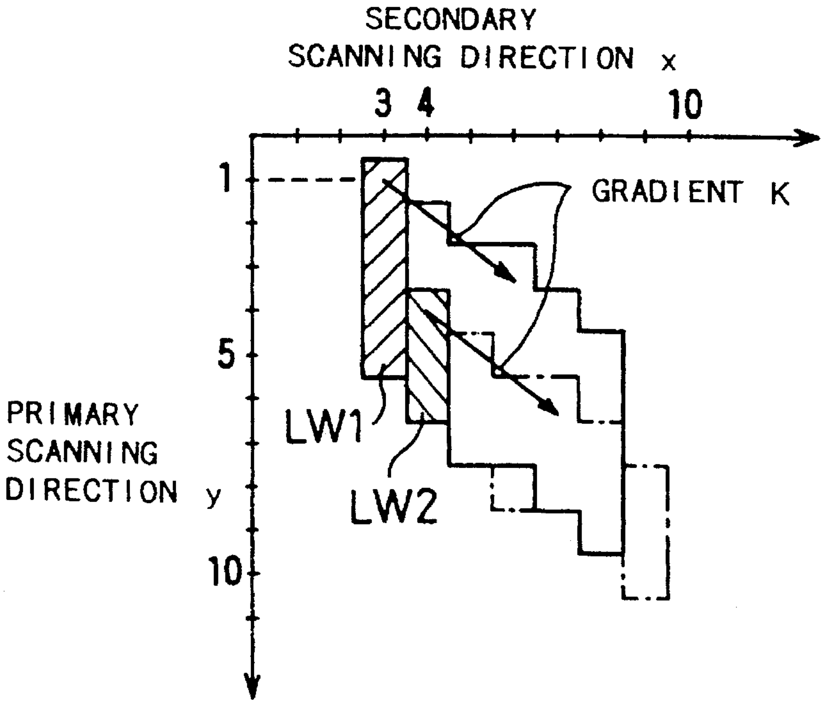

FIGS. 11A and 11B schematically illustrate the righthand-side shadowing process. Suppose that the target linework area is a line segment LW1 separated from other linework areas as shown in FIG. 11A. The line segment LW1 is defined between the primary-scanning coordinates y=1 and y=5 on a primary scanning line, and having the secondary-scanning coordinate x=3. The linework area LW1 is successively shifted by one scanning line in a specific direction specified by a predetermined gradient k (k=0.8 in this embodiment), thereby forming a plurality of shadow line segments S1, S2 . . . Sn. The sum of the shadow line segments S1, S2, . . . Sn constitutes a shadow area S.

In the example of FIG. 11B, the target linework area includes the line segment LW1 and an adjacent line segment LW2. Each of the line segments LW1 and LW2 is successively shifted by one scanning line in a specific direction specified by the gradient k to form a plurality of shadow line segments. The sum of the shadow line segments for the first line segment LW1 is shown by the solid line whereas that for the second line segment LW2 is shown by the one-dot chain line. The total sum of these shadow line segments constitutes a shadow area.

Figure 12:
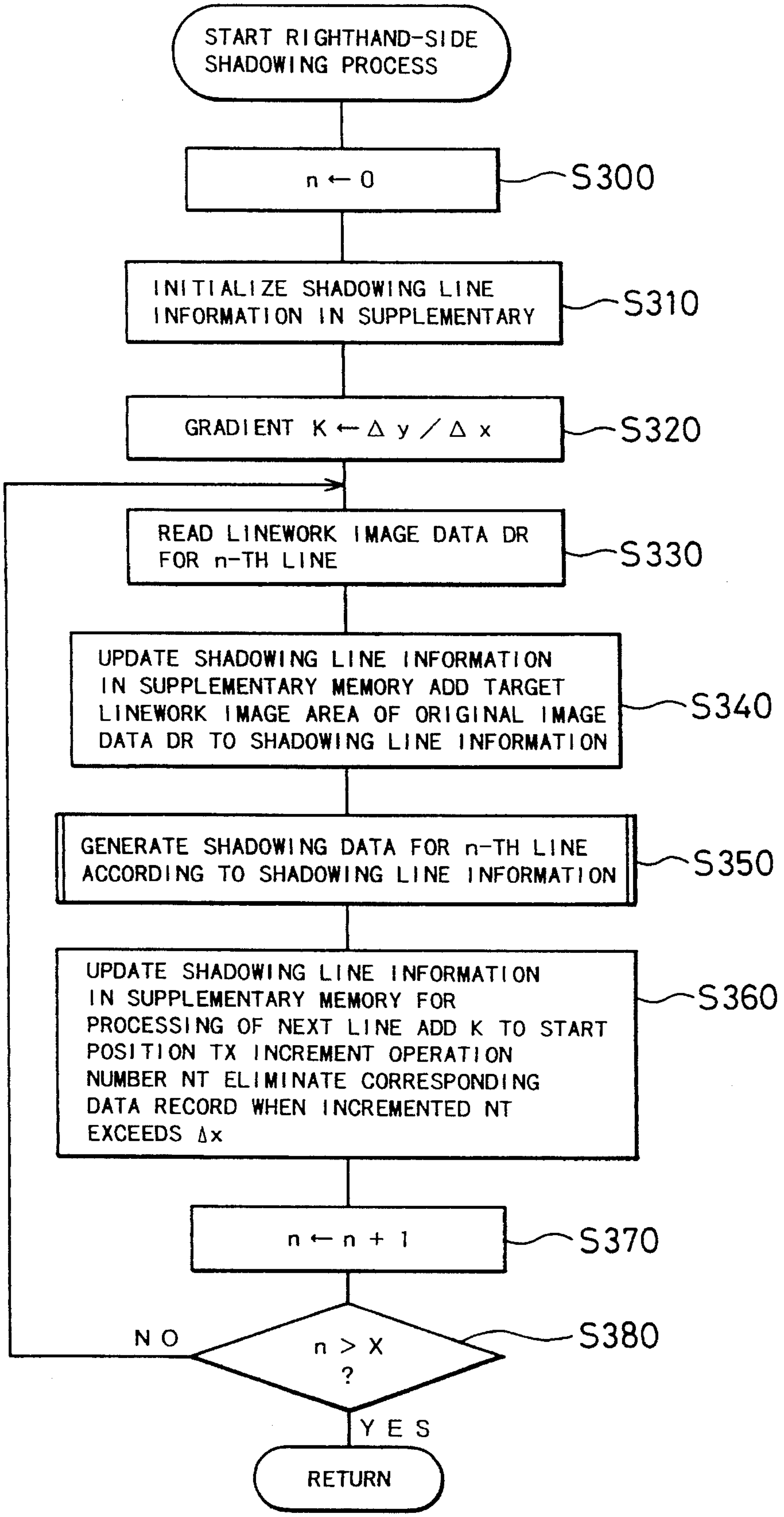
FIG. 12 is a flowchart showing details of the righthand-side shadowing process executed at step S220 or S250 of the flowchart of FIG. 8.
Figures 13A, 13B:
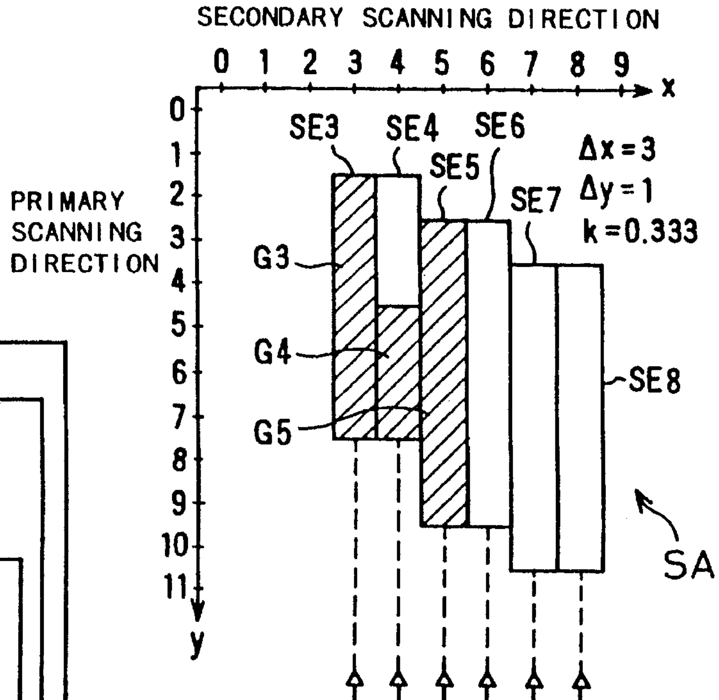
FIG. 13A shows target line segments and shadow line segments.
FIG. 13B shows the contents of shadowing line information.

FIG. 12 is a flowchart showing the detailed procedure of the righthand-side shadowing process. FIGS. 13A and 13B illustrate the target linework image, and specific data used in the righthand-side shadowing process, respectively. The target linework image has a plurality of line segments G3, G4, and G5 on the 3rd, 4th, and 5th scanning lines, respectively, which will be hereinafter referred to as "original line segments". The line segment G3 ranges from y=2 to y=7, G4 ranges from y=5 to y=7, and G5 ranges from y=3 to y=9. The offset values Δx and Δy are set at 3 and 1, respectively, in this example.

At step S300 in FIG. 12, a variable n is initialized to zero. The variable n is an ordinal number indicating a current scanning line under processing.

Figure 14:
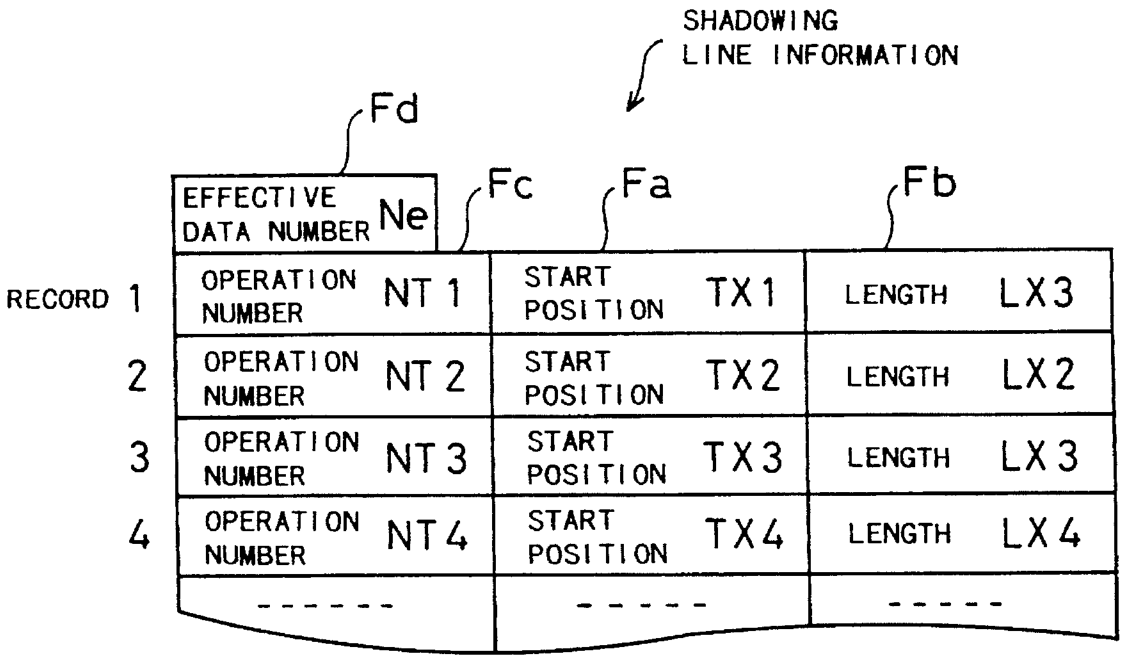
FIG. 14 shows the structure of the shadowing line information.

At step S310, shadowing line information, which is stored in the supplementary memory 10, is initialized. FIG. 14 schematically illustrates the structure of the shadowing line information. The shadowing line information includes run length data indicating a shadow line segment. The run length data is constituted from a plurality of data records, each of which consists of a start position field Fa indicating a start position TX of a shadow line segment on each scanning line, a length field Fb indicating a length LX of the shadow line segment, and a process number field Fc indicating the number of operations (hereinafter referred to as operation number) NT executed as of a current moment. The operation number NT is an integer while the start position TX and the length LX can be decimals. The shadowing line information further includes on its header region an effective data number field Fd for storing the number Ne of data records. The effective data number Ne is used as a parameter for specifying the number of data records in the shadowing line information when reading out the shadowing line information from the supplementary memory 10. The fields Fa, Fb, Fc, and Fd are all cleared to zero at step S310.

At step S320, the gradient k representing the direction of the shadowing process is calculated by:

$$k=\Delta y/\Delta x \qquad (1)$$

At step S330, original linework image data DR for an n-th scanning line is read out from the image memory 2. The following steps S340 through S380 are skipped for the scanning lines at x=0, 1, and 2, because there are no original line segments on these scanning lines. In other words, no actual processing is executed for the scanning lines at x=0, 1, and 2.

On the third scanning line, or the scanning line at x=3, the original linework image data DR representing the first original line segment G3 is read out from the image memory 2 at step S330. The original linework image data DR on the 3rd scanning line indicates TX=2 and LX=6 as shown in column (B) of the third scanning line in FIG. 13B. At this stage, however, no data is registered in the shadowing line information yet.

At step S340, the target line segment G3 having the target color number NcA is extracted from the original linework image data DR, and the run length data representing the target line segment G3 is added to the shadowing line information. Since the shadowing line information has no actual data before this step, the run length data of the target line segment G3, which indicates TX=2 and LX=6, is registered in the shadowing line information while its operation number NT is set at zero as shown in column (C) of the third scanning line in FIG. 13B.

At step S350, shadowing data representing a shadow line segment on the n-th scanning line is produced based on the shadowing line information. In this embodiment, the shadowing data represents a combination of the original line segment G3 and shadow line segments on the current scanning line which are produced on the basis of the original line segments on the previous scanning lines. Since there are no original line segments on the previous scanning lines, the shadowing data on the third scanning line represents a shadow line segment SE3, which conforms with the original line segment G3 itself. The shadowing data indicating TX=2 and LX=6 therefore is produced at step S350 on the third scanning line, as shown in column (D) of the third scanning line in FIG. 13B, and memorized in the image memory 2. The shadowing data can have the same data as the original linework image data, as is the case with the third scanning line, because the original linework image is laid over the shadow area in reproducing the shadowed image.

When the shadowing line information includes run length data indicating a shadow line segment as well as an original line segment, the procedure at step S350 becomes more complicated. The detailed procedure at step S350 will be described later.

Figure 15A:
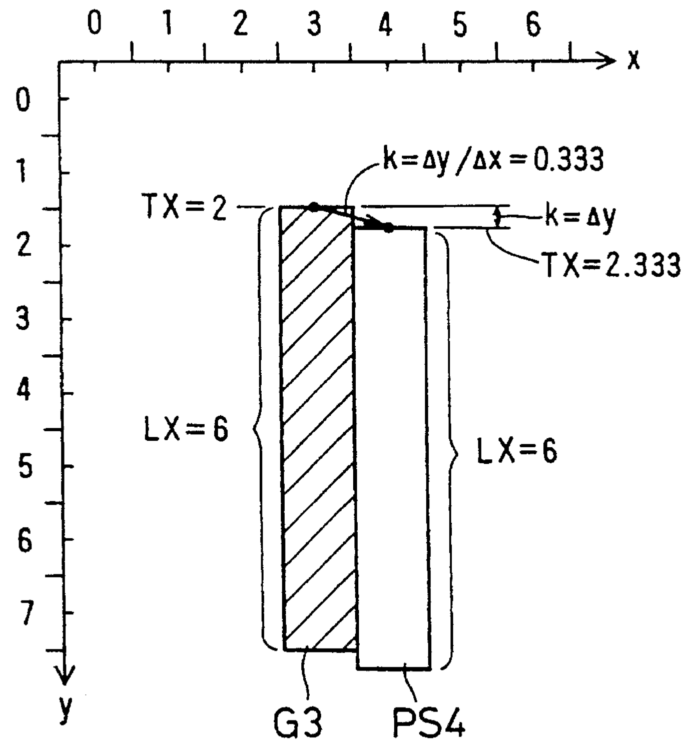
FIGS. 15A and 15B schematically illustrate the processing at steps S360, S330, and S340 for the fourth scanning line.
Figure 15B:
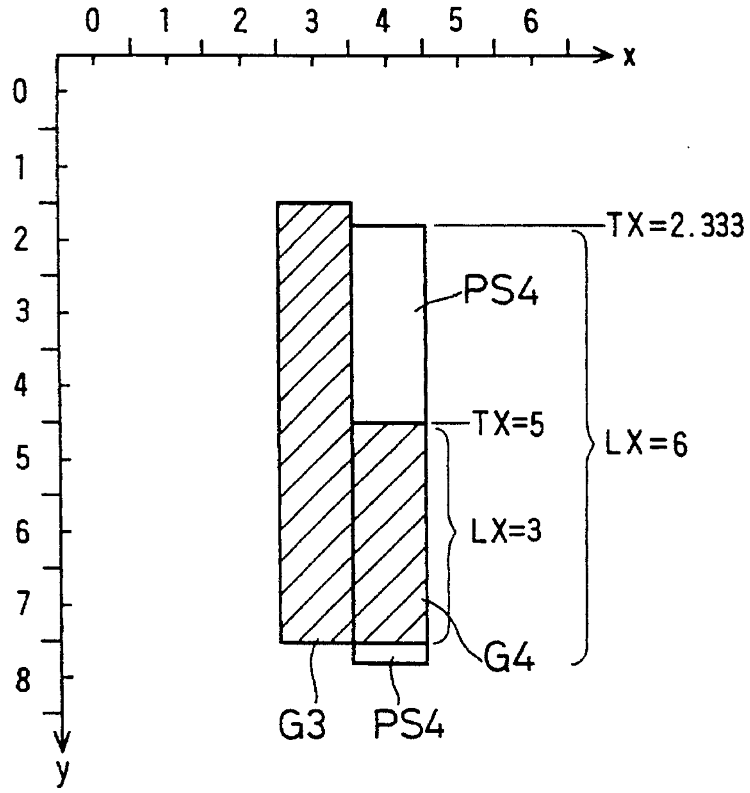

At step S360, a preliminary shadow line segment on the (n+1)-th scanning line is produced on the basis of the shadowing line information. FIG. 15B schematically illustrates the processing at step S360 on the fourth scanning line. Before the step S360, the shadow line segment represented by the shadow line information, which is shown in column (D) of FIG. 13B, is the same as the original line segment G3. The preliminary shadow line segment PS4 on the fourth scanning line is a line segment which is made by shifting the shadow line segment G3 on the previous scanning line according to the gradient k as shown in FIG. 15A. The gradient k is equal to the component of the shift in the primary scanning direction between two adjacent scanning lines. The preliminary shadow line segment PS4 therefore is represented by TX=2.333 and LX=6, where the new value of TX is obtained by adding the gradient k to the previous value of TX. The reason why the new shadow line segment PS4 is called "preliminary" here is because the final shadow line segment is obtained from the preliminary shadow segment.

The shadow line information is updated at step S360 to represent the preliminary shadow line segment PS4 on the subsequent scanning line. More concretely, the value of the gradient k is added to the start position TX at each data record of the shadowing line information, and the operation number NT is increased by one. Accordingly, the shadowing line information indicating TX=2, LX=6, and NT=0 at step S340 on the third scanning line is changed at step S360 on the fourth scanning line to indicate TX=2.333, LX=6, and NT=1 as shown in column (A) of FIG. 13B.

When the offset value Δy is negative, the value of the gradient k given by Equation (1) is negative too. This means that the direction of shadowing is slanting upward in the primary scanning direction.

At step S370, the variable n is incremented by one. At the following step S380, the incremented variable n is compared with a dimension X of the target linework image in the secondary scanning direction. When the variable n is not greater than X, the program returns to step S330 to repeat steps S330 through S380 for the next scanning line. When the variable n is greater than X at step S380, the program exits from the routine of FIG. 12.

At step S330 on the fourth scanning line, original linework image data DR representing the original line segment G4 (FIG. 13A) is read out from the image memory 2. The original linework image data DR for the fourth scanning line indicates TX=5 and LX=3 as shown in column (B) of FIG. 13B.

At step S340, the shadowing line information is updated as shown in column (C) of FIG. 13B, which includes three data records: TX=2.333, LX=2.667, and NT=1; TX=5.000, LX=3.000, and NT=0; and TX=8.000, LX=0.333, and NT=1. FIGS. 16A through 16D schematically illustrate the processing at step S340 under various conditions concerning the relation between the original line segment and the preliminary shadow line segment. As shown in these figures, the sum of the original line segment G on the n-th scanning line and a preliminary shadow line segment PS on the n-th scanning line is combined in the updated shadowing line information at step S340.

Figure 16A:
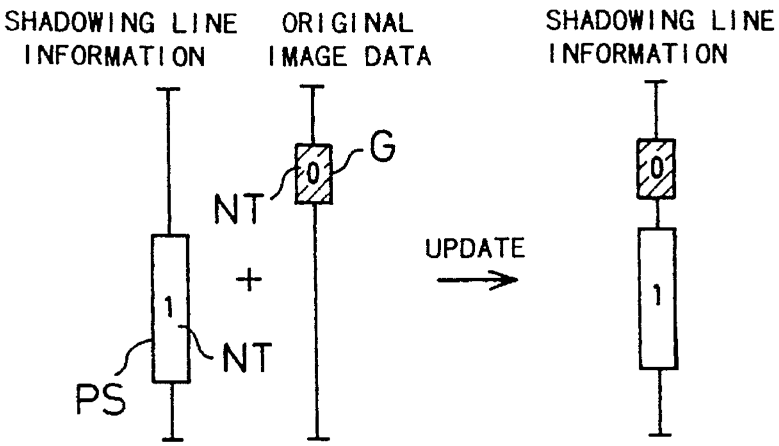
FIGS. 16A through 16D conceptually show the general processing at step S340.

For example, if the preliminary shadow line segment PS is apart from the original linework area G as shown in FIG. 16A, a new data record for the original line segment G is added to the shadowing line information at step S340. As a result, the shadowing line information includes two data records representing the preliminary shadow line segment PS and the original line segment G, respectively. The numerals written in the blocks showing the line segments PS and G in FIG. 16A indicate the operation number NT. The operation number NT is set at zero for the original line segment G, as described before, and it is more than one for the preliminary shadow line segment PS.

Figure 16B:
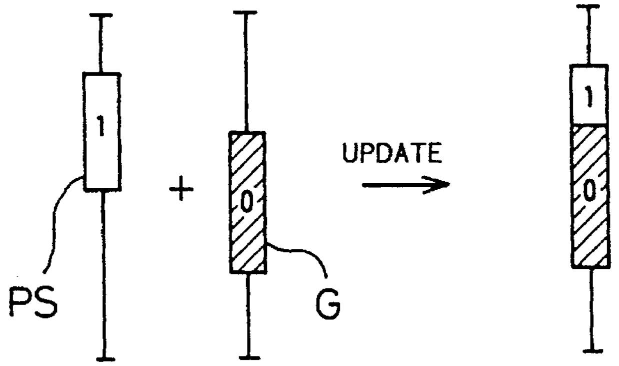

If the preliminary shadow line segment PS and the original line segment G partly overlap each other as shown in FIG. 16B, the sum of the line segments PS and G are registered in the updated shadowing line information such that the original line segment G is laid over the preliminary shadow line segment PS. In other words, the original line segment G has a priority over the preliminary shadow line segment PS in the overlapping portion.

Figure 16C:
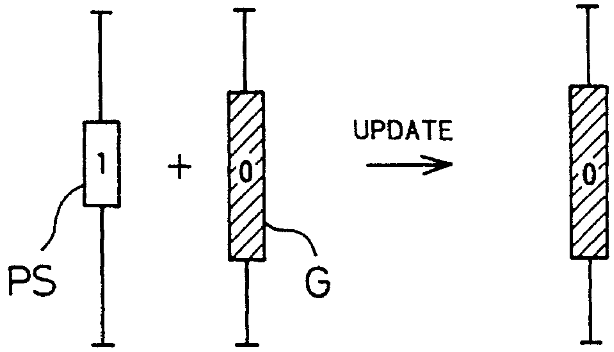

If the whole of the preliminary shadow line segment PS is included in the original line segment G as shown in FIG. 16C, only the original line segment G is registered in the updated shadow line information.

Figure 16D:
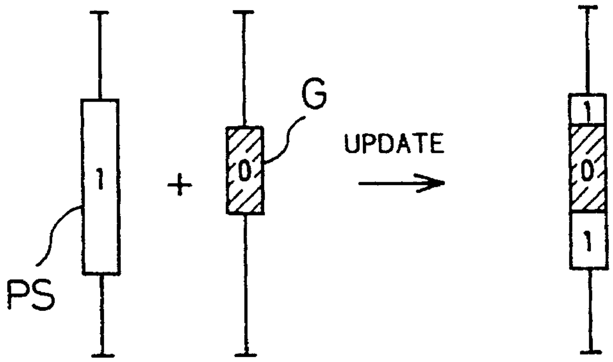

If, on the other hand, the whole of the original line segment G is included in the preliminary shadow line segment PS as shown in FIG. 16D, the original line segment G is kept in the overlapping region while the preliminary shadow line segment PS remains in the rest. In this case, three data records for the three divided parts are registered in the updated shadow line information.

FIG. 15B illustrates the relation between the original line segment G4 and the preliminary shadow line segment PS4 on the fourth scanning line. Since this relation corresponds to that shown in FIG. 16D, three data records indicating the three divided parts on the fourth scanning line are registered in the shadowing line information. The three data records shown in column (C) are produced accordingly.

At step S350 on the fourth scanning line, the shadowing data representing a shadow line segment on the fourth scanning line is produced based on the updated shadowing line information. There are two matters to be taken into consideration in the processing at step S350. The first one is that it is necessary to make the shadow line segment in contact with the original line segment on the previous scanning line. This is because if the shadow line segment is separate from the original line segment on the previous scanning line, the final line segment will not seem like a shadow. The second one is that the shadowing data representing the shadow line segment is to have integral values for the start position TX and the run length LX because only the line segments expressed by integral values can be reproduced in this embodiment.

According to the first consideration, the processing at step S350 depends on the relation between an original line segment on the previous scanning line and a preliminary shadow line segment on the current scanning line.

Figure 17A:
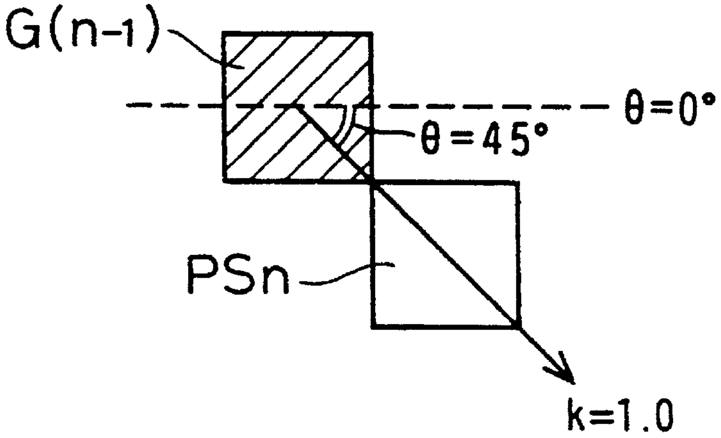
FIGS. 17A and 17B show the difference in the processing at step S350 depending on a gradient k.
Figure 17B:
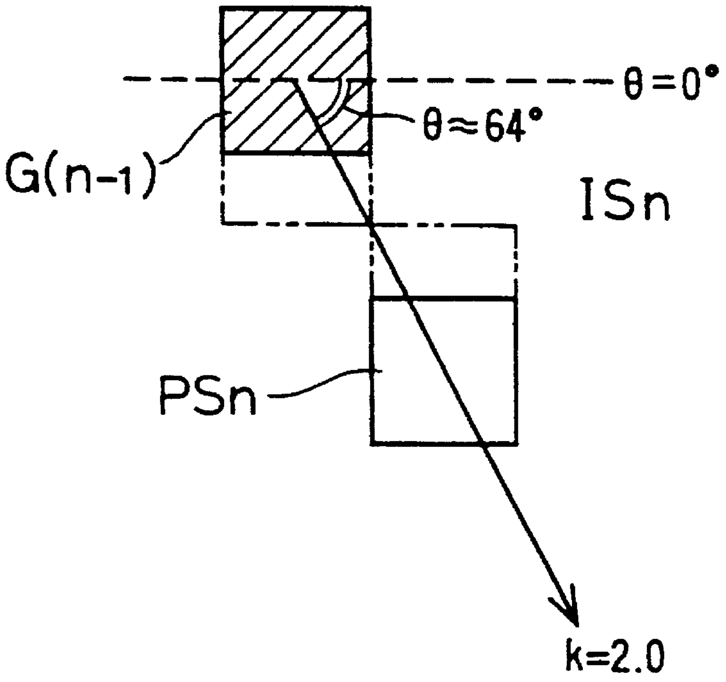

FIGS. 17A and 17B schematically illustrate the relation between an original line segment G(n−1) on the (n−1)-th scanning line and a preliminary shadow line segment PSn, which is made from the line segment G(n−1). These line segments have only one pixel for convenience of illustration. FIGS. 17A and 17B correspond to two cases where the gradient k satisfies the expression (2) and (3), respectively:

$$-1.0 \leqq k \leqq +1.0 \quad \ldots (2)$$

$$k < -1.0 \text{ or } 1.0 < k \quad \ldots (3)$$

Since the gradient k is 0.333 in this embodiment, the processing of step S350 is described in the first case where the gradient k satisfies the expression (2). The processing of step S350 in the second case, where the gradient k satisfies the expression (3), will be described later.

If the gradient k satisfies the expression (2), a shadowing angle θ (=tan−1k) is in a range between −45 and +45 degrees. In this case, the preliminary shadow line segment PSn is not separate from but is in contact with the original line segment G(n−1) as shown in FIG. 17A. The shadowing data representing the shadow line segment on the n-th scanning line is obtained by rounding the decimal place of each value in the data record of the shadowing line information to a nearest whole number. Since the gradient k is 0.333 in this embodiment, this type of processing is performed at step S350.

Figure 18:
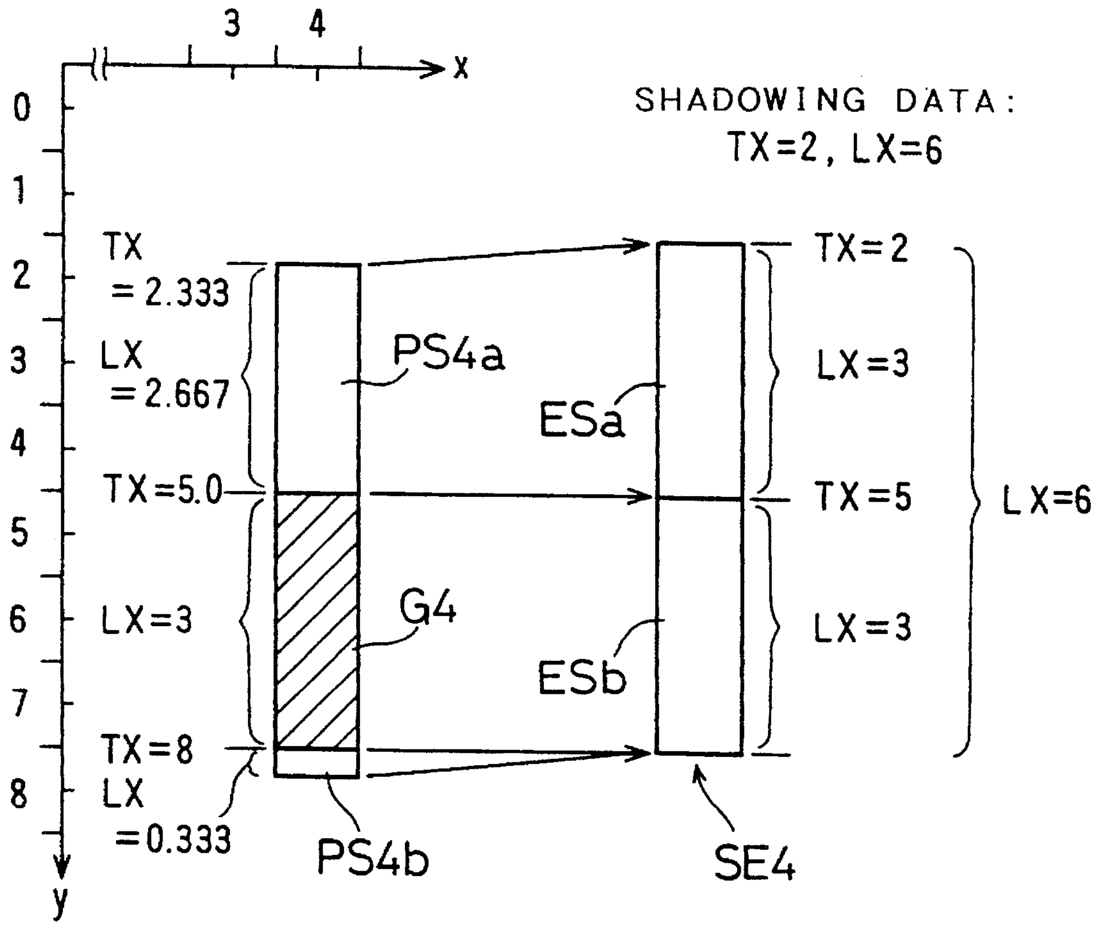
FIG. 18 schematically illustrates the processing at step S350 for the fourth scanning line.

The preliminary shadow line segment PS4 and the original line segment G4 shown in FIG. 15B are represented by the shadowing line information shown in column (C) on the fourth scanning line in FIG. 13B. FIG. 18 schematically illustrates the processing at step S350 on the fourth scanning line. The three data records in the shadowing line information represent the line segments PS4a, G4, and PS4b shown in FIG. 18, respectively. Effective shadow line segments ESa and ESb, which constitute the shadow line segment SE4 on the fourth scanning line, are produced from the line segments PS4a, G4, and PS4b as follows.

The decimal place of the start position TX=2.333 of the first line segment PS4a is rounded to TX=2, which indicates the start position of the effective shadow line segment ESa. The end position of the line segment PS4a is expressed by (TX+LX), which is 5.0 for the line segment PS4a. The end position (TX+LX)=5.0 is also rounded to (TX+LX)=5, which indicates the end position of the effective shadow line segment ESa. As can be understood from FIG. 18, the end position (TX+LX) actually indicates the position at which the following area starts. Accordingly, the effective shadow line segment ESa is represented by TX=2 and LX=3 as shown in FIG. 18.

In order to obtain the effective shadow line segment ESb, the start position TX=5.000 of the line segment G4 is rounded to TX=5, and its end position (TX+LX)=8.000 is rounded to (TX+LX)=8. That is, the line segment G4 becomes the effective shadow line segment ESb as it is. The effective shadow line segment ESb is represented by TX=5 and LX=3 accordingly.

As for the line segment PS4b, the rounded value of the start position TX=8.0 and that of the end position (TX+LX)=8.333 are both equal to eight. Consequently, no effective shadow line segment is produced from the line segment PS4b.

The effective shadow line segments ESa and ESb are then combined together to form the shadow line segment SE4 on the fourth scanning line. In the example of FIG. 18, the shadowing data representing the shadow line segment SE4 is expressed by TX=2 and LX=6, which is shown in column (D) of the fourth scanning line in FIG. 13B. The shadowing data is memorized in the image memory 2 in a memory region different from that for the original linework image data.

Incidentally, the shadowing line information is not changed in step S350, and it remains as shown in column (C) of FIG. 13B.

Figure 19A:
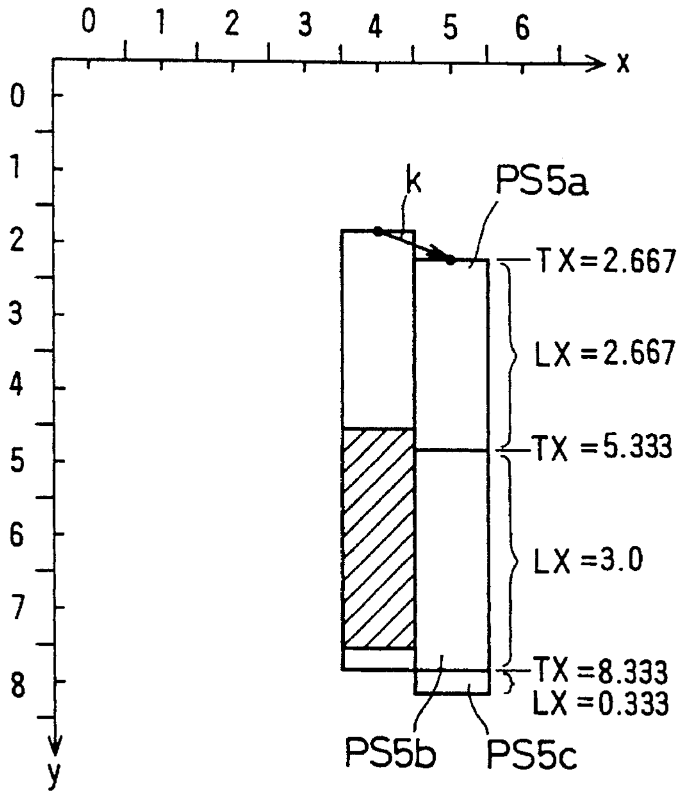
FIGS. 19A through 19E schematically illustrate the processing for the fifth through seventh scanning lines.

At step S360, the shadowing line information is updated for the fifth scanning line. More concretely, the gradient k is added to the start position TX of each data record of the shadowing line information shown in column (C) of the fourth scanning line in FIG. 13B, thereby making the shadowing line information shown in column (A) of the fifth scanning line. The operation number NT of each data record is simultaneously increased by one. FIG. 19A illustrates three preliminary shadow line segments represented by the shadowing line information at this stage.

Figure 19B:
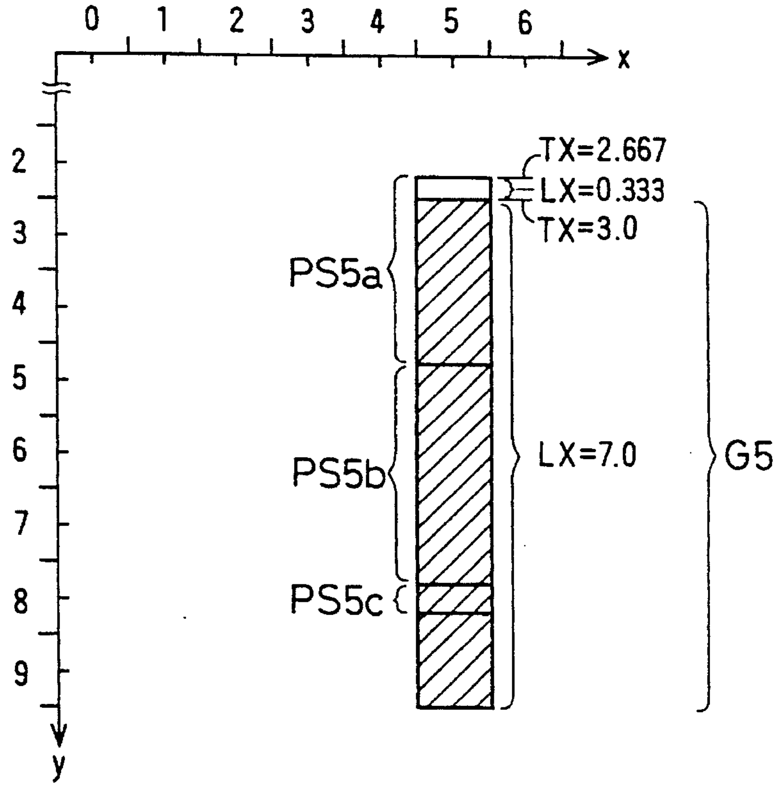

At step S330 for the fifth scanning line, original linework image data DR representing an original line segment G5 is read from the image memory 2. The original linework image data DR indicates the start position TX=3 and the length LX=7 as shown in column (B) of the fifth scanning line in FIG. 13B. Through the updating process of step S340, a data record representing the original line segment G5 is added in the shadowing line information. FIG. 19B schematically illustrates the line segments represented by the shadowing line information shown in column (C) of the fifth scanning line in FIG. 13B. Since the original line segment G5 covers almost all of the preliminary shadow line segments PS5a, PS5b, and PS5c, only a small top portion of the preliminary shadow line segment PS5a, which is represented by TX=2.667 and LX=0.333, is left after the processing at step S340.

Figure 19C:
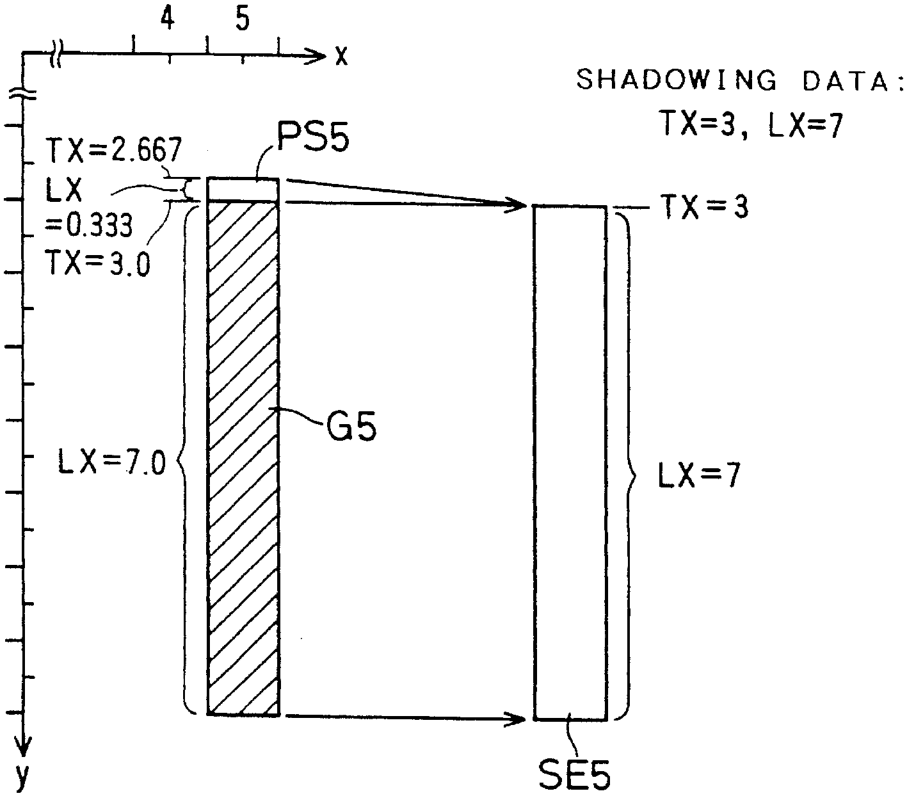

FIG. 19C schematically illustrates the processing at step S350 for the fifth scanning line. The start position TX=2.667 of the preliminary shadow line segment PS5 and its end position (TX+LX)=3.000 are both rounded to 3. The start position TX=3.0 and the end position (TX+LX)=10.0 of the original line segment G5 are rounded to 3 and 10, respectively. Shadowing data representing a shadow line segment SE5 on the fifth scanning line is expressed by TX=3 and LX=7, accordingly, which is shown in column (D) of the fifth scanning line in FIG. 13B. The shadow line segment SE5 happens to conform with the original line segment G5.

Figure 19D:
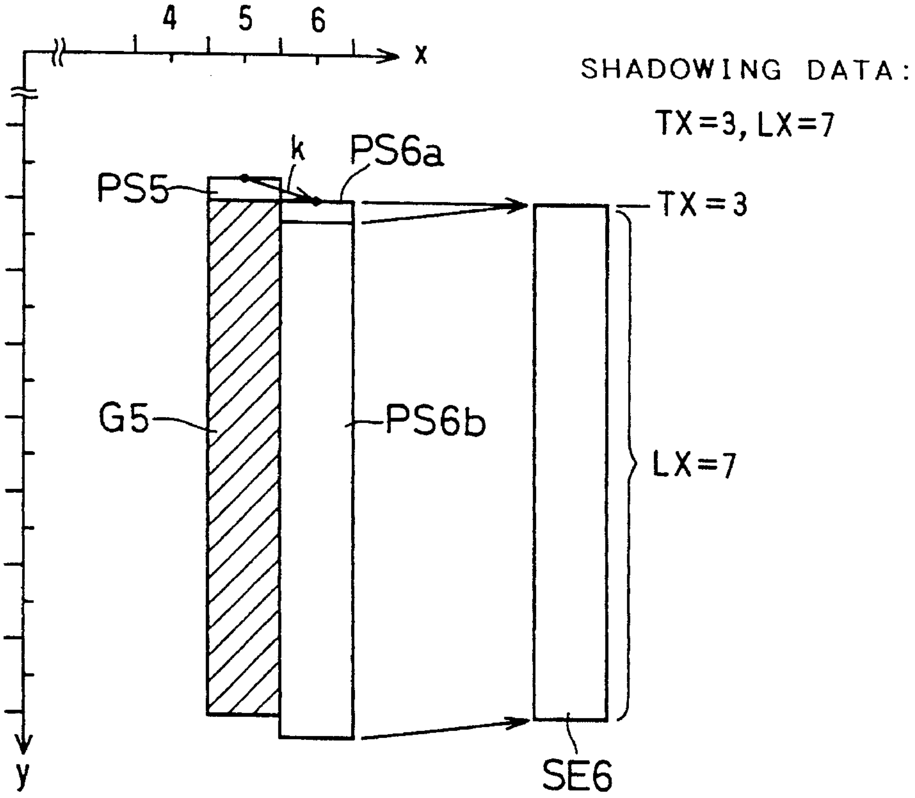

At step S360, the shadowing line information shown in column (C) of the fifth scanning line in FIG. 13b is updated to that shown in column (A) of the sixth scanning line. The shadowing line information includes two data records of: TX=3.0, LX=0.333, and NT=3; and TX=3.333, LX=7, and NT=1. FIG. 19D illustrates two preliminary shadow line segments PS6a and PS6b on the sixth scanning line represented by the shadowing line information.

Since there are no original line segments in the sixth scanning line as shown in FIG. 13A, the shadowing line information does not change after the updating process of step S340. At step S350, shadowing data of TX=3 and LX=7 is produced, which represents a shadow line segment SE6 shown in FIGS. 19D and 13A.

Figure 19E:
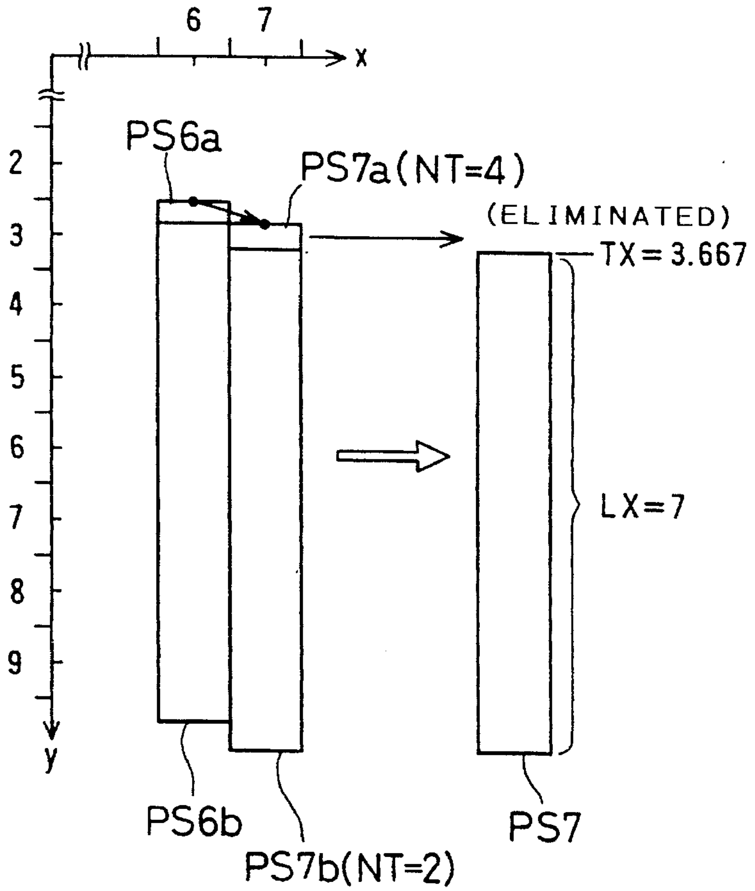

FIG. 19E schematically illustrates the processing at step S360 for the seventh scanning line. As described before, the start position TX of each data record of the shadowing line information is increased by the value of the gradient k=0.333, and the operation number NT is increased by one at step S360.

When the updated operation number NT of a data record becomes greater than the offset value Δx=3, the shadowing process is complete for that data record. The data record is eliminated from the updated shadowing line information accordingly. As shown in FIG. 19E, the data record for a preliminary shadow line segment PS7a is eliminated and that for PS7b=PS7 is left in the shadowing line information. The data record for the preliminary shadow line segment PS7 is shown in column (A) of the seventh scanning line in FIG. 13B.

Figure 20:
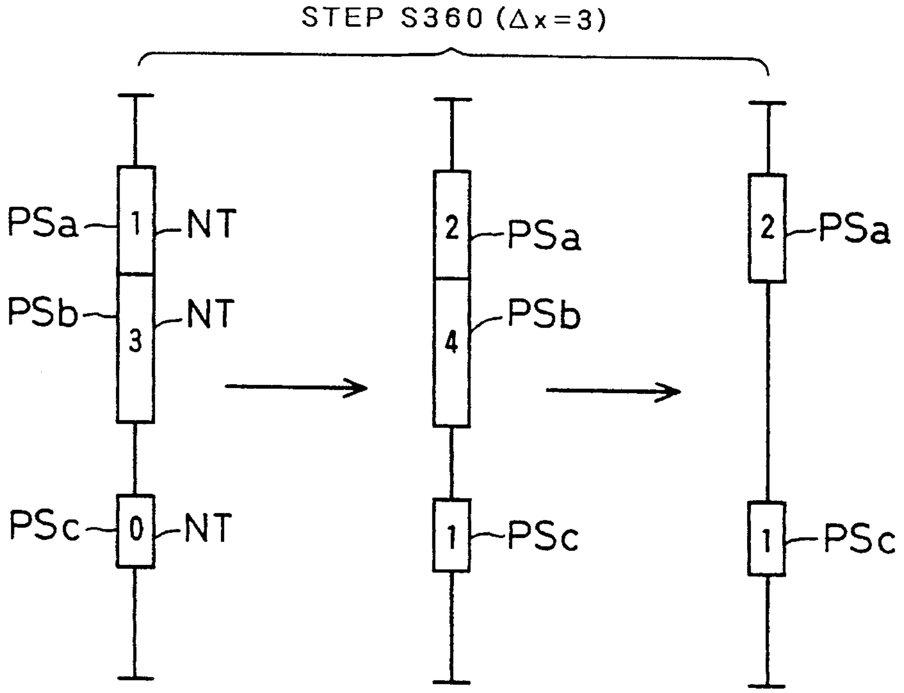
FIG. 20 shows the elimination of a data record executed at step S360.

FIG. 20 shows the general process of eliminating a data record at step S360. Suppose that the operation number NT of line segments PSa, PSb, and PSc become two, four, and zero, respectively, by the updating process at step S360. Since the operation number NT=4 of the line segment PSb is greater than the offset value Δx=3, the data record representing the line segment PSb is removed from the updated shadowing line information.

The offset value Δx indicates the number of scanning lines on which shadow line segments are produced from one original line segment.

Since there are no original line segments in the seventh scanning line, the shadowing line information does not change after the updating process of step S340 as shown in FIG. 13B. Shadowing data of TX=4 and LX=7 for the seventh scanning line is then produced at step S350. The shadowing data represents a shadow line segment SE7 shown in FIG. 13A.

The shadowing line information is updated to TX=4.0, LX=7.0 and NT=3 after the updating process of step S360, as shown in column (A) of the eighth scanning line in FIG. 13B.

Since there are no original line segments on the eighth scanning line, the shadowing line information does not change by the updating process of step S340. Shadowing data of TX=4 and LX=7 for the eighth scanning line is then produced at step S350. The shadowing data represents a shadow line segment SE8 shown in FIG. 13A.

When the shadowing line information shown in column (C) of the eighth scanning line in FIG. 13B is updated at step S360, the operation number NT becomes four, which is greater than the offset value Δx=3. The data record is eliminated accordingly, and no data records are left in the shadowing line information.

The sum of the shadow line segments SE3, SE4, SE5, SE6, SE7, and SE8 for the respective scanning lines forms a shadow area SA for the target linework image area including the original line segments G3, G4, and G5.

FIG. 21 shows another way of explaining how the shadow area SA for the target linework image is produced. A shadow area SG3 is formed from the original line segment G3 according to the gradient k and the offset Δx. Although the shadow area SG3 includes the original line segment G3 itself, it can exclude the original line segment G3 because the original line segment G3 is laid over the shadow area SG3 in reproducing a shadowed linework image. Shadow areas SG4 and SG5 are formed from the original line segments G4 and G5, respectively, in the same manner. The shadow area for the target linework area is given by the sum of these shadow area SG3, SG4, and SG5. The procedure of FIG. 12 substantially executes the processing shown in FIG. 21.

The shadow area SA is then filled with a desired color to seem like a real shadow of the original linework image. The color of the shadow area is indicated by the final-shadowing color number NcB specified at step S200 of FIG. 8.

At step S180 of FIG. 5, a composite image including the shadow area and the target linework image area is displayed on the color monitor 3 as a result of the shadowing process. Here the original linework image is laid over the shadow area.

Figure 22:
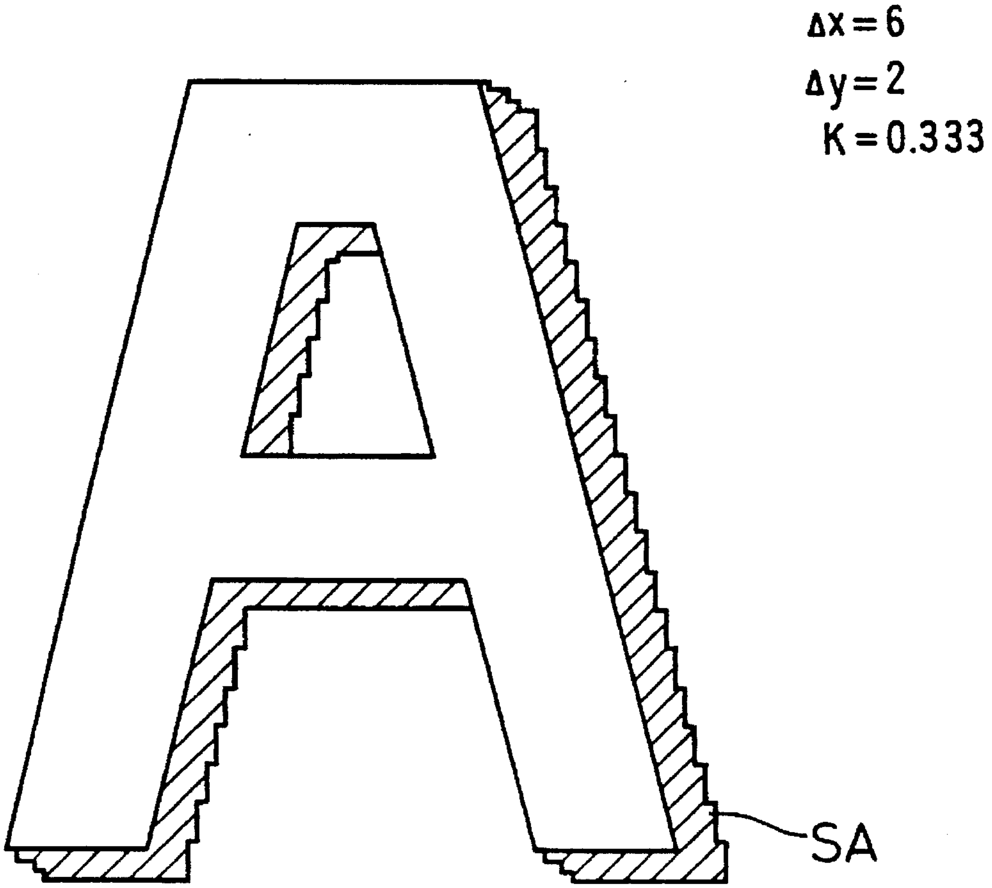
FIG. 22 shows an original image area having a shadow area produced according to the preferred embodiment.

FIG. 22 illustrates a composite image including a target linework image of a character "A" and its shadow area SA formed according to the above embodiment. The offset values Δx and Δy are set to six and two, respectively, for convenience of illustration. The shadow area SA has a desirable three-dimensional effect on the target linework image.

C-4 Righthand-side Shadowing for Expression (3)

If the gradient k satisfies the expression (3) as shown in FIG. 17B, the shadowing angle θ (=tan−1k) satisfies that −90<θ<−45 or +45<θ<90. In this case, the preliminary shadow line segment PSn is separate from the original line segment G(n−1). These line segments G(n−1) and PSn therefore are extended to contact each other as shown with dashed lines when the shadowing data is produced at step S350. The steps other than step S350 in FIG. 12 are the same as the case where the gradient k satisfies the expression (2), or the case shown in FIG. 17A.

Figures 23A, 23B:
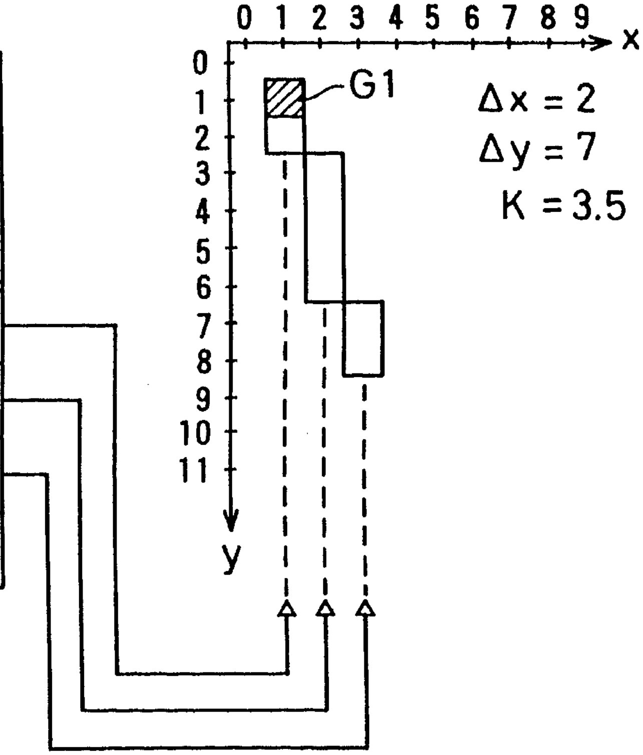
FIG. 23A shows target line segments and shadow line segments produced when the gradient k satisfies expression (3)
FIG. 23B shows the contents of shadowing line information.

FIGS. 23A and 23B illustrate a target linework image and specific data used in the righthand-side shadowing process when the gradient k satisfies the expression (3). The original linework image has only one line segment G1 of one pixel length located at the coordinates (1, 1). The offset values Δx and Δy are respectively set to 2 and 7, which makes the gradient k equal to 3.5.

The original linework image data for the first scanning line therefore indicates the start position TX=1.000, and the run length LX=1.000 as shown in column (B) in FIG. 23B. The shadowing line information produced at step S340 has a data record of TX=1.0, LX=1.0, and NT=0, accordingly.

Figure 24A:
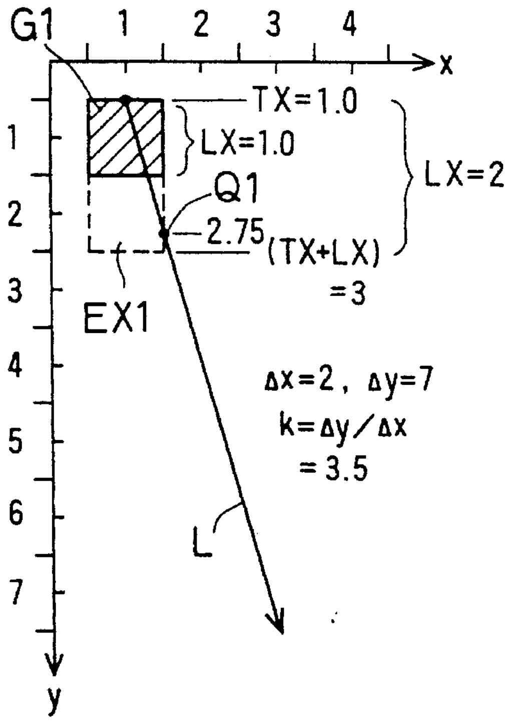
FIGS. 24A through 24C schematically illustrate the righthand-side shadowing process when the gradient k satisfies expression (3)

FIG. 24A illustrates the processing at step S350 for the first scanning line. At this step, it is judged for each data record of the shadowing line information whether or not the operation number NT is equal to zero. If the operation number NT of a data record is zero, the data record is identified as representing an original line segment. Since shadow line segments are formed at the right-downward side of each original line segment, original line segments are not extended upward but they are only extended downward. The start position TX of the shadowing data for the first scanning line therefore is set equal to the start position TX=1.0 of the original line segment G1, and the end position (TX+LX) of the shadowing data is extended with an extension segment EX1.

The end position (TX+LX) of the shadowing data is determined as follow: An imaginary line L having the gradient k is drawn from the original line segment G1, and a primary-scanning coordinate is obtained of an intersection Q1 of the imaginary line L and a vertical line between the first and second scanning lines. Actually, the primary-scanning coordinate of the intersection Q1 is obtained to be 2.75 by adding half the value of the gradient k (=1.75) to the start position TX=1.000. The end position (TX+LX) of the extension segment EX1 is then obtained by omitting the figures below the decimal point of the value 2.75 and by adding one to the value. In the example of FIG. 24A, the end position (TX+LX) of the extension segment EX1 is 3.0. As explained before, the end position (TX+LX) actually indicates the start position of the following area in the same scanning line.

The shadow line segment for the first scanning line is a sum of the original line segment G1 and the extension segment EX1. Accordingly, the shadowing data of TX=1 and LX=2 is produced for the first scanning line at step S350 as shown in column (D) in FIG. 23B. Incidentally, the shadowing line information shown in column (C) is not changed by the processing of step S350.

At step S360 for the second scanning line, the start position TX of the shadowing line information is increased by the gradient k=3.5, and the operation number NT is increased by one. The updated shadowing line information is shown in column (A) of the second scanning line in FIG. 23B. Since there are no original line segments on the second scanning line, the shadowing line information remains the same after step S340.

Figure 24B:
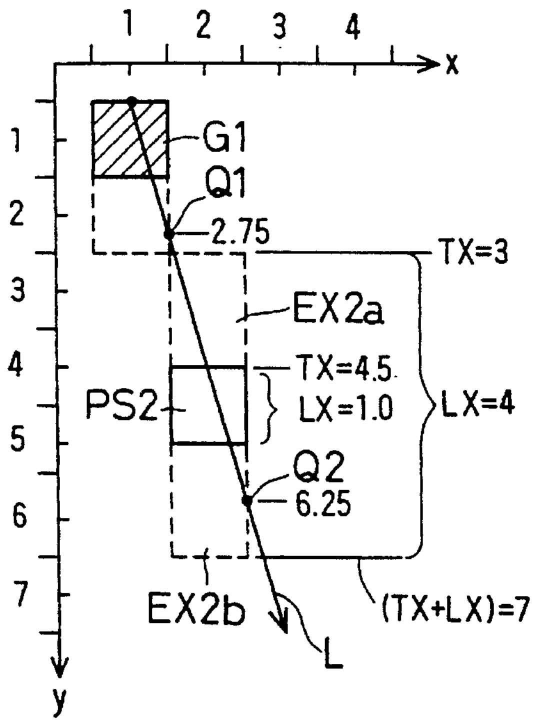

FIG. 24B illustrates the processing at step S350 for the second scanning line. It is judged for the data record of the shadowing line information whether the operation number NT is zero or not. Since the operation number NT is not zero in the data shown in column (C) of the second scanning line in FIG. 23B, the data record is identified not to represent an original line segment, but a preliminary line segment. In this case, the preliminary line segment PS2 is extended both upward and downward with extension segments EX2a and EX2b as shown in FIG. 24B.

Incidentally, it is also judged whether the operation number NT is equal to the offset value Δx=2 or not, if the operation number NT is not equal to zero at step S350. This judgement will be described later with respect to the third scanning line.

The shadowing data for the second scanning line is obtained as follows: Primary scanning coordinates of the intersection Q1 and another intersection Q2, which is that of the line L of the gradient k and a vertical line between the second and third scanning lines, are calculated to be 2.75 and 6.25, respectively. The start position TX of the first extension segment EX2a is obtained by raising the figures below the decimal point of the coordinate 2.75 of the intersection Q1 to a unit, thereby making TX=3. The end position (TX+LX) of the second extension segment EX2b is obtained by omitting the figures below the decimal point of the coordinate 6.25 of the intersection Q2 and by adding one to the value, thereby making (TX+LX)=7. The shadowing data for the second scanning line is expressed by TX=3 and LX=4 accordingly, as shown in column (D) in FIG. 23B.

At step S360 for the third scanning line, the start position TX of the shadowing line information is increased by the gradient k=3.5, and the operation number NT is increased by one. The updated shadowing line information is shown in column (A) of the third scanning line in FIG. 23B. Since there are no original line segments on the third scanning line, the shadowing line information remains the same after step S340.

Figure 24C:
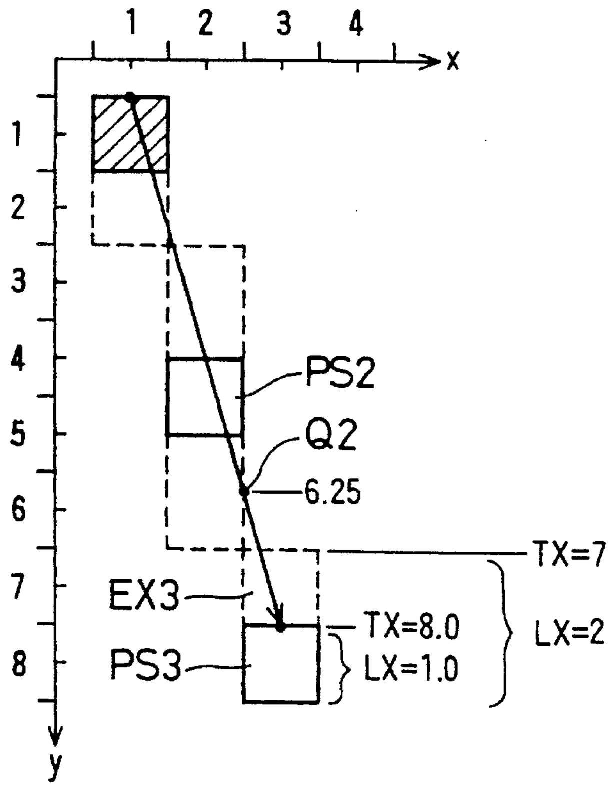

FIG. 24C illustrates the processing at step S350 for the third scanning line. It is judged for the data record of the shadowing line information whether the operation number NT is zero or not. Since the operation number NT is not zero in the data shown in column (C) of the third scanning line in FIG. 23B, the data record is identified as not representing an original line segment, but a preliminary line segment. It is also judged whether the operation number NT is equal to the offset value Δx=2 or not. If the operation number NT is equal to two, as is the case with the data record shown in column (C) of the third scanning line in FIG. 23B, the preliminary line segment PS3 represented by the data record is identified to be the last part of the shadow line segments produced from one original line segment. The preliminary line segment PS3 is extended only upward but not downward with an extension segment EX3 as shown in FIG. 24C.

The shadowing data for the third scanning line is obtained as follows: The start position TX of the extension segment EX3 is obtained by raising the figures below the decimal point of the coordinate 6.25 of the intersection Q2 to a unit, thereby making TX=7. The end position (TX+LX) of the preliminary shadow line segment PS3 is given by simply adding its start position TX=8.0 and its end position LX=1.0, thereby making (TX+LX)=9. The shadowing data for the third scanning line is expressed by TX=7 and LX=2 accordingly, as shown in column (D) in FIG. 23B.

If the shadowing line information of each scanning line includes a plurality of data records in the above procedure, the shadowing data for each scanning line is determined by processing each data record according the above procedure and by combining the shadowing data on the same scanning line together to constitute the final shadowing data.

Figure 25:
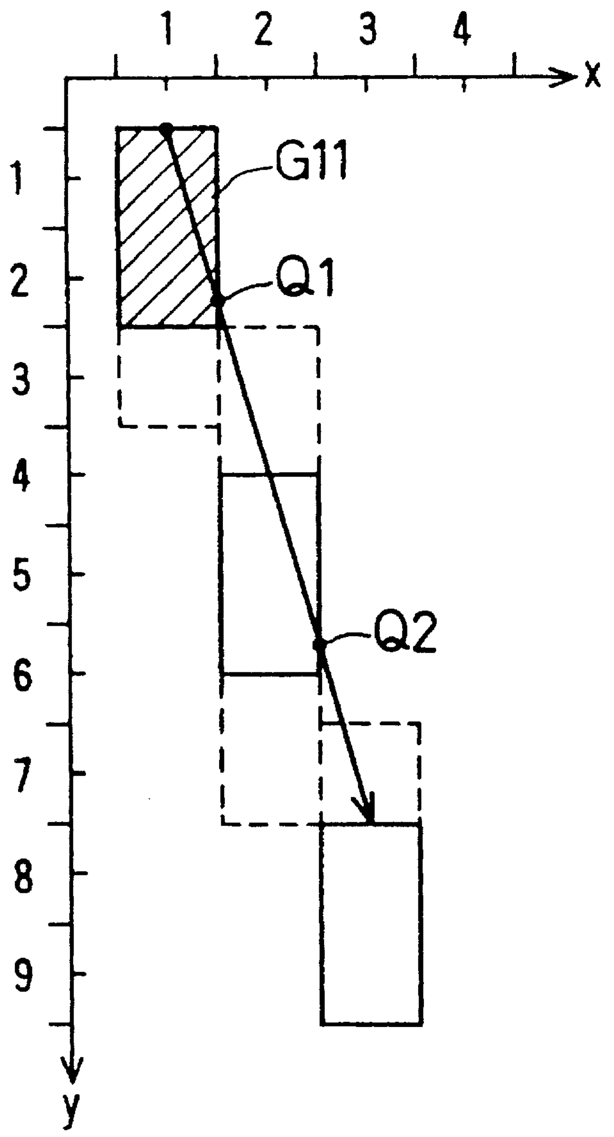
FIGS. 25 and 26 schematically illustrate the righthand-side shadowing process for the target line segment including plural pixels when the gradient k satisfies expression (3)

FIG. 25 illustrates another example of the procedure of the righthand-side shadowing process when the gradient k satisfies the expression (3). In FIG. 25, an original line segment G11 includes a plurality of pixels, more specifically, two pixels. The offset values Δx and Δy are respectively set equal to 2 and 7 as in the first example.

In the second example, the final shadow line segment is determined with respect to a start pixel of the original line segment G11 as in the first example and then extended by the length of the segment G11 minus one pixel in the primary scanning direction to constitute the shadowing data. As shown in FIG. 24C, the extended shadow line segments of the start pixel of the original line segment G11 ranges from y=1 to y=2 on the first scanning line, from y=3 to y=6 on the second scanning line, and from y=7 to y=8 on the third scanning line, respectively. The shadow line segment, which is extended by one pixel (the length=2 of the shadow line segment G11 minus one pixel), thus ranges from y=1 to y=3 on the first scanning line, from y=3 to y=7 on the second scanning line, and from y=7 to y=9 on the third scanning line as shown in FIG. 25. The sum of the extended shadow line segments constitutes the shadow area.

Figures 26A, 26B, 26C:
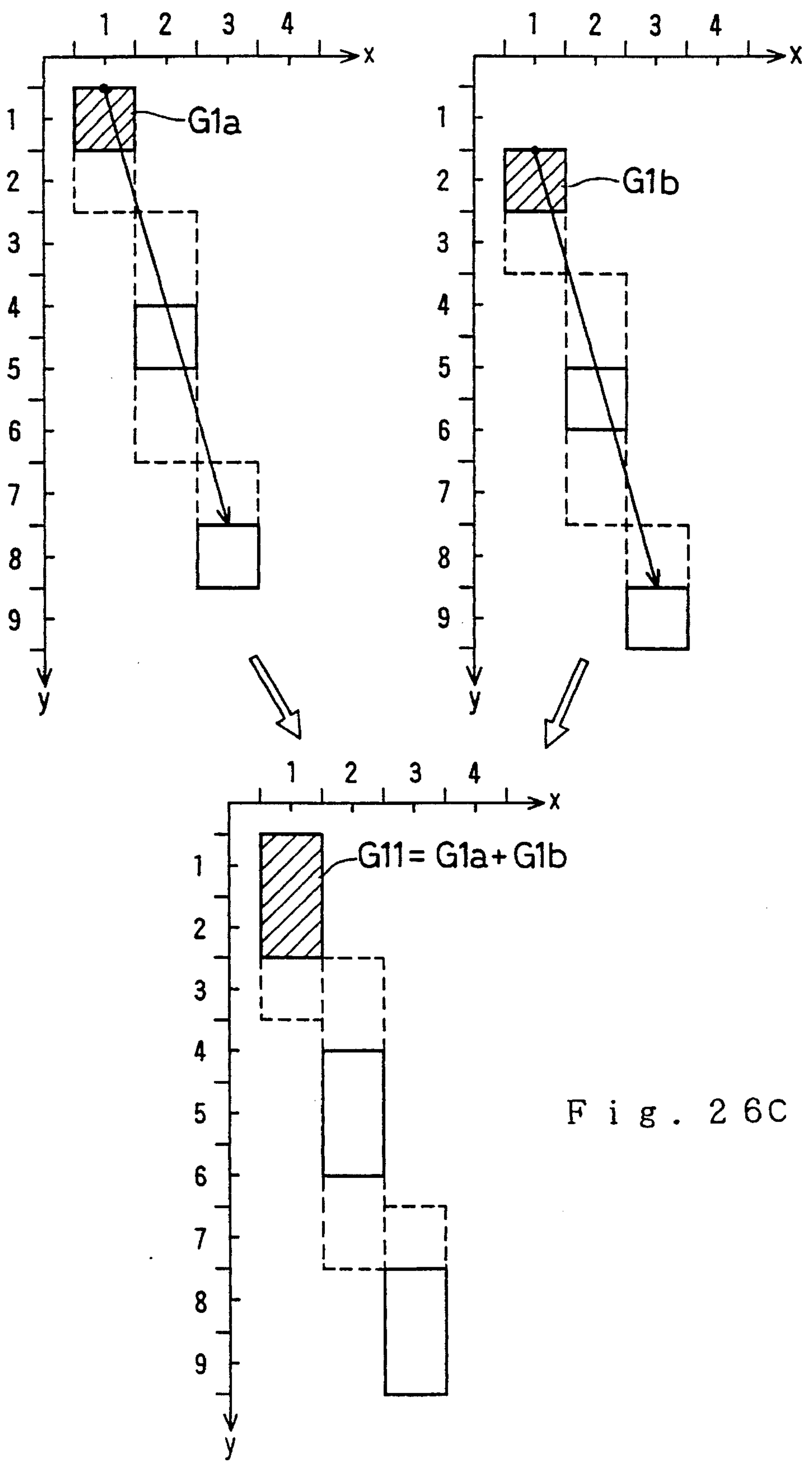

The final shadow area for the original line segment G11, however, can be obtained by processing each pixel of the line segment G11 according to the procedure described in FIGS. 24A through 24C. FIG. 26 schematically illustrates such processing. In this case, a first pixel G11*a* and a second pixel G1*b* of the original line segment G11 are processed to form respective shadow areas. The shadow area of the original line segment G11 is given by the sum of the shadow areas of the first and second pixels G1*a* and G1*b*. The shadow area of the original line segment G11 shown in FIG. 26 is the same as that shown in FIG. 25.

C-5 Details of the Vertical Shadowing Process

FIG. 27 is a flowchart showing the procedure of the vertical shadowing process executed at step S270.

In the vertical shadowing process, run length data stored in the image memory 2 is read out for each scanning line, and an original line segment represented by the run length data of each scanning line is shadowed downward (in a direction where the primary-scanning coordinate y increases) or upward (in a direction where the primary-scanning coordinate y decreases).

When the vertical shadowing process starts, a variable n is initialized to zero at step S400, where n indicates a current scanning line under processing.

At step S410, original linework image data DR for the n-th scanning line is read out of the image memory 2. The program then proceeds to step S420 at which it is determined whether the original linework image data DR for the n-th scanning line includes data representing a target line segment having the target color number NcA.

Figure 28A:
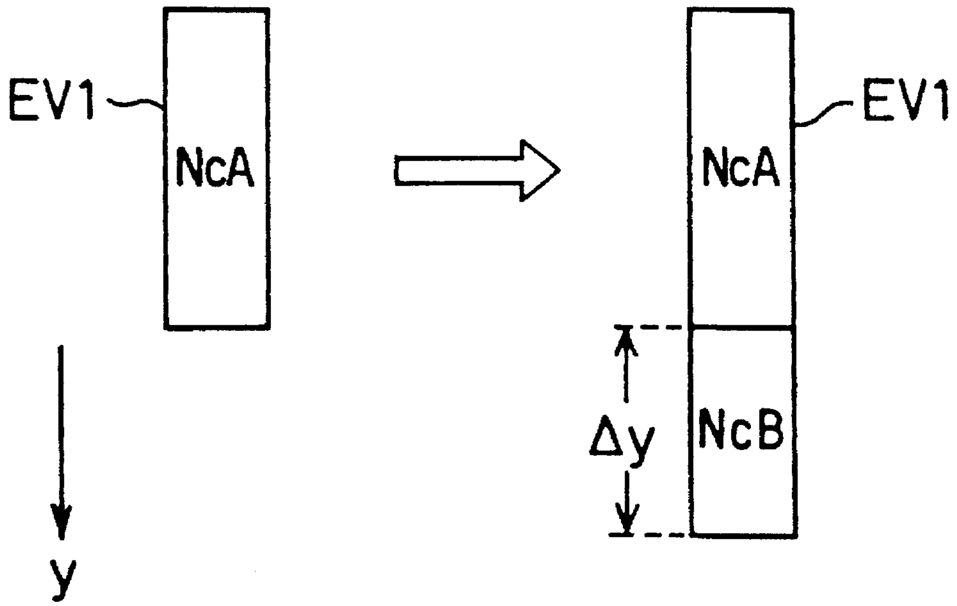
FIGS. 28N and 28B show an example of the vertical shadowing process.

When the answer is YES at step S420, the program goes to step S430, at which the offset value Δy is compared with zero. When the offset value Δy is greater than zero, the program goes to step S440 at which a length LX of the target line segment included in the original linework image data DR is extended by the offset value Δy to generate a supplementary line segment, or a shadow line segment. The supplementary line segment is stored in the image memory 10 in the form of run length data having the final-shadowing color number NcB. For example, as shown in FIG. 28A, a target line segment EV1 having the target color number NcA is extended by the offset value Δy downward in the primary scanning direction to generate a shadow line segment having the final-shadowing color number NcB.

Figure 28B:
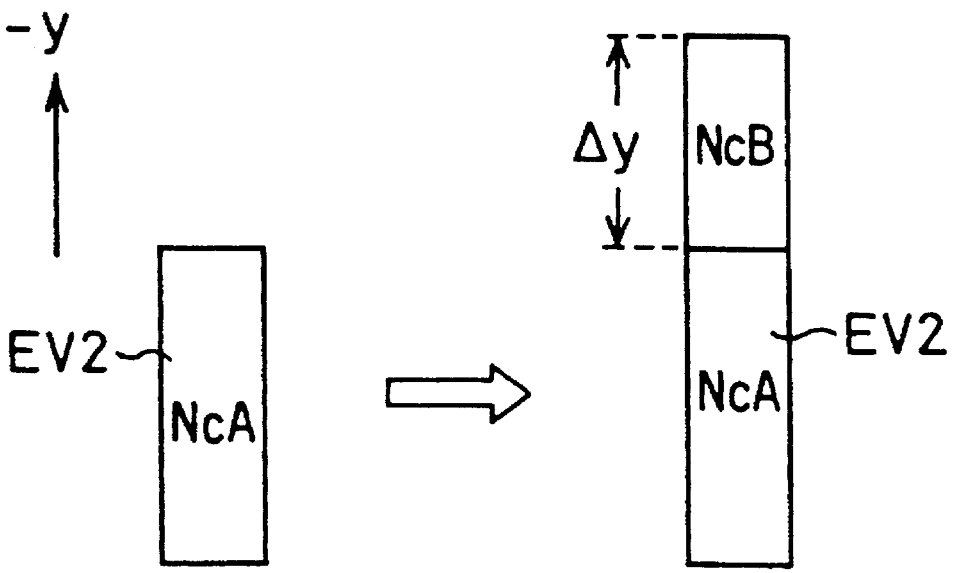

When the offset value Δy is smaller than zero at step S430, the program proceeds to step S450 at which the offset value Δy is subtracted from the start position TX of the target line segment included in the original linework image data DR while the run length LX of the target line segment is extended by the offset value Δy to generate a shadow line segment. The shadow line segment is stored in the form of run length data having the final-shadowing color number NcB. For example, as shown in FIG. 28B, a target line segment EV2 having the target color number NcA is extended by the offset value Δy upward in the primary scanning direction to generate a shadow line segment having the final-shadowing color number NcB.

After the processing of step S440 or S450 is completed or when the original linework image data DR for the n-th scanning line is determined not to include a target line segment at step S420, the program proceeds to step S460 at which the variable n is incremented by one. At the following step S470, the incremented variable n is compared with the dimension X of the target linework image in the secondary scanning direction. When n is not greater than the dimension X, the program returns to step S410 to repeat steps S420 through S470 for the next scanning line. On the other hand, when n exceeds X, the program exits from the vertical shadowing process routine.

As described above in detail, the righthand-side shadowing process and the vertical shadowing process efficiently and effectively generate a shadow area by processing run length data based on the gradient k and the offset value Δx. The process of the embodiment thereby attains high-speed shadowing of a linework image area. Especially, reading and writing of the original linework image data with respect to each pixel is not required in the above embodiment, and this significantly improves the processing speed over the conventional process. A shadow area generated according to the above embodiment gives a desirable three-dimensional effect to a linework image area.

Although the lefthand-side shadowing process includes the mirror processing and the righthand-side shadowing process as shown in FIGS. 10A through 10D, the lefthand-side shadowing process can be executed by extracting original linework image data DR in a direction where the secondary-scanning coordinate decreases while decreasing the variable n by one. The lefthand-side shadowing without the mirror process further improves the speed of shadowing process.

Although the offset values Δx and Δy are input as shadowing parameters, any values can be used as the shadowing parameters as far as they substantially indicate the gradient k and the offset value Δx. For example, the gradient k and the offset value Δx can be input directly as the shadowing parameters.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of processing image data representing a target linework image area to thereby produce a supplementary area adjacent to said linework image area, comprising the steps of:

(a) preparing image data, stored in a first memory, representing a target linework image area with respect to each scanning line in a primary scanning direction, said target linework image area being specified to have a predetermined color, said image data and said supplementary area data being run length data including a start position of a line segment and a length of the line segment;

(b) specifying shift parameters indicating a gradient of a shift of said target linework image area and a range of said shift in a secondary scanning direction;

(c) successively reading out a set of said image data from said first memory in order of a secondary scanning coordinate of each primary scanning line, said set of said image data representing a linework image on a target primary scanning line, said step (c) comprising the steps of:

(c-1) memorizing said set of said image data read out from said first memory in a second memory;

(c-2) memorizing an ordinal number of said set of image data, said ordinal number being set at a predetermined initial value when said set of said image data is memorized in said second memory; and (c-3) increasing said ordinal number by one every time when another set of said image data of a next primary scanning line is read out from said first memory; and (d) shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said step (d) comprising the steps of:

(d-1) obtaining a start position of said supplementary line segment on said each of primary scanning lines from a start position of said target line segment as a function of said gradient of said shift, and updating said set of said image data memorized in said second memory with said start position of said supplementary line segment;

(d-2) comparing said ordinal number of said set of said image data at said each of primary scanning lines, thereby eliminating said set of said image data from said second memory when said ordinal number is greater than a sum of said initial value and said range of said shift; and (d-3) extending said supplementary line segment along said primary scanning line to thereby make said supplementary area in contact with said target linework image area.

2. A method in accordance with claim 1, wherein said step (d) further comprises the step of:

(d-4) combining a plurality of supplementary line segments existing on each primary scanning line, each of said plurality of supplementary line segments being obtained for respective target line segments.

3. A method of processing image data representing a target linework image area to thereby produce a supplementary area adjacent to said linework image area, comprising the steps of:

(a) preparing image data, stored in a first memory, representing a target linework image area with respect to each scanning line in a primary scanning direction, said target linework image area being specified to have a predetermined color, said image and said supplementary area data are run length data including a start position of a line segment and a length of the line segment;

(b) specifying shift parameters indicating a gradient of a shift of said target linework image area and a range of said shift in a secondary scanning direction;

(c) successively reading out a set of said image data from said first memory in order of a secondary scanning coordinate of each primary scanning line, said set of said image data representing a linework image on a target primary scanning line, said step (c) comprising the step of:

(c-1) memorizing said set of said image data read out from said first memory in a second memory; and (d) shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said step (d) comprising the steps of:

(d-1) obtaining a start position of said supplementary line segment on said each of primary scanning lines from a start position of said target line segment as a function of said gradient of said shift, and updating said set of said image data memorized in said second memory with said start position of said supplementary line segment; and (d-2) inverting said target lineswork image area to make a mirror image of said target linework image area when said range of said shift is less than zero.

4. A method of processing image data representing a target linework image area to thereby produce a supplementary area adjacent to said linework image area, comprising the step of:

(a) preparing image data, stored in a first memory, representing a target linework image area with respect to each scanning line in a primary scanning direction, said target linework image area being specified to have a predetermined color, said image data and said supplementary area data being run length data including a start position of a line segment and a length of the line segment;

(b) specifying shift parameters indicating a gradient of a shift of said target linework image area and a range of said shift in a secondary scanning direction;

(c) successively reading out a set of said image data from said first memory in order of a secondary scanning coordinate of each primary scanning line, said set of said image data representing a linework image on a target primary scanning line, said step (c) comprising the steps of:

(c-1) memorizing said set of said image data read out from said first memory in a second memory; and (c-2) reading out said unit of said image data from said first memory in inverted order of said secondary scanning coordinate of each primary scanning line when said range of said shift is less than zero; and (d) shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said step (d) comprising the step of:

(d-1) obtaining a start position of said supplementary line segment on said each of primary scanning lines from a start position of said target line segment as a function of said gradient of said shift, and updating said set of said image data memorized in said second memory with said start position of said supplementary line segment.

5. An image processing apparatus for processing image data representing a target linework image area to thereby produce a supplementary area to said linework image area, comprising:

a first memory for storing image data representing a target linework image area with respect to each scanning line in a primary scanning direction, said target linework image area being specified to have a predetermined color, said image data and said supplementary area data being run length data including a start position of a line segment and a length of the line segment;

a second memory for memorizing said set of image data read out from said first memory, said second memory further memorizing an ordinal number of said set of image data, said ordinal number being set at a predetermined initial value when said set of said image data is memorized in said second memory;

parameter input means for specifying shift parameters indicating a gradient of a shift of said target linework area and a range of said shift in a secondary scanning direction;

image data reading means for successively reading out a set of said image data from said first memory in order of a secondary scanning coordinate of each primary scanning line, said set of said image data representing a linework image on a target primary scanning line; and supplementary area production means for shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, wherein said supplementary area production means comprises:

means for obtaining a start position of said supplementary line segment on said each of primary scanning lines from a start position of said target line segment as a function of said gradient of said shift, and updating said set of said image data memorized in said second memory with said start position of said supplementary line segment; and supplementary area correction means for extending said supplementary line segment along said primary scanning line to thereby make said supplementary area in contact with said target linework image area; and ordinal number updating means for increasing said ordinal number by one every time when another set of said image data of a next primary scanning line is read out from said first memory.

6. An image processing apparatus in accordance with claim 5, wherein said supplementary area production means further comprises:

composing means for combining a plurality of supplementary line segments existing on each primary scanning line, each of said plurality of supplementary line segments being obtained for respective target line segments.

7. An image processing apparatus for processing image data representing a target linework image area to thereby produce a supplementary area to said linework image area, comprising:

a first memory for storing image data representing a target linework image area with respect to each scanning line in a primary scanning direction, said target linework image area being specified to have a predetermined color;

parameter input means for specifying shift parameters indicating a gradient of a shift of said target linework area and a range of said shift in a secondary scanning direction;

image data reading means for successively reading out a set of said image data from said first memory in order of a secondary scanning coordinate of each primary scanning line, said set of said image data representing a linework image on a target primary scanning line, said image data and said supplementary area data being run length data including a start position of a line segment and a length of the line segment; a second memory for memorizing said set of said image data read out from said first memory; and supplementary area production means for shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said supplementary area production means further comprising:

means for obtaining a start position of said supplementary line segment on said each of primary scanning lines from a start position of said target line segment as a function of said gradient of said shift, and updating said set of said image data memorized in said second memory with said start position of said supplementary line segment; and mirror effect processing means for inverting said target linework image area to make a mirror image of said target linework image area when said range of said shift is less than zero.

8. An image processing apparatus for processing image data representing a target linework image area to thereby produce a supplementary area to said linework image area, comprising:

a first memory for storing image data representing a target linework image area with respect to each scanning line in a primary scanning direction, said target linework image area being specified to have a predetermined color;

parameter input means for specifying shift parameters indicating a gradient of a shift of said target linework area and a range of said shift in a secondary scanning direction;

image data reading means for successively reading out a set of said image data from said first memory in order of a secondary scanning coordinate of each primary scanning line, said set of said image data representing a linework image on a target primary scanning line, said image data and said supplementary area data are run length data including a start position of a line segment and a length of the line segment, said image data means comprising means for reading out said unit of said image data from said first memory in inverted order of said secondary scanning coordinate of each primary scanning lines when said range of said shift is less than zero; and a second memory for memorizing said set of said image data read out from said first memory; and supplementary area production means for shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said supplementary area production means comprising means for obtaining a start position of said supplementary line segment on said each of primary scanning lines from a start position of said target line segment as a function of said gradient of said shift, and updating said set of said image data memorized in said second memory with said start position of said supplementary line segment.

9. A method of processing image data representing a target linework image area to thereby produce a supplementary area adjacent to said linework image area, comprising the steps of:

(a) preparing image data, stored in a first memory, representing a target linework image area with respect to each scanning line in a primary scanning direction, said target linework image area being specified to have a predetermined color, said image and said supplementary area data are run length data including a start position of a line segment and a length of the line segment;

(b) specifying shift parameters indicating a gradient of a shift of said target linework image area and a range of said shift in a secondary scanning direction;

(c) successively reading out a set of said image data from said first memory in order of a secondary scanning coordinate of each primary scanning line, said set of said image data representing a linework image on a target primary scanning line, said step (c) comprising the step of:

(c-1) memorizing said set of said image data read out from said first memory in a second memory; and (d) shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said step (d) comprising the steps of:

(d-1) obtaining a start position of said supplementary line segment on said each of primary scanning lines from a start position of said target line segment as a function of said gradient of said shift, and updating said set of said image data memorized in said second memory with said start position of said supplementary line segment; and (d-2) extending said target line segment in said primary scanning direction when said range of said shift is equal to zero, to thereby produce said supplementary line segment.

10. An image processing apparatus for processing image data representing a target linework image area to thereby produce a supplementary area to said linework image area, comprising:

a first memory for storing image data representing a target linework image area with respect to each scanning line in a primary scanning direction, said target linework image area being specified to have a predetermined color;

parameter input means for specifying shift parameters indicating a gradient of a shift of said target linework area and a range of said shift in a secondary scanning direction;

image data reading means for successively reading out a set of said image data from said first memory in order of a secondary scanning coordinate of each primary scanning line, said set of said image data representing a linework image on a target primary scanning line, said image data and said supplementary area data being run length data including a start position of a line segment and a length of the line segment; a second memory for memorizing said set of said image data read out from said first memory; and supplementary area production means for shifting a target line segment represented by said set of said image data according to said shift parameters to thereby produce supplementary area data representing a supplementary area for said target line segment, said target line segment having said predetermined color, said supplementary area including a supplementary line segment on each of primary scanning lines which are within said range of said shift from said target primary scanning line, said supplementary area production means further comprising:

means for obtaining a start position of said supplementary line segment on said each of primary scanning lines from a start position of said target line segment as a function of said gradient of said shift, and updating said set of said image data memorized in said second memory with said start position of said supplementary line segment; and vertical extending means for extending said target line segment in said primary scanning direction when said range of said shift is equal to zero, to thereby produce said supplementary line segment.

11. A method of processing linework image data representing a target linework image area to thereby produce a supplementary area to said linework image area, comprising the steps of:

(a) preparing run length data, stored in a first memory, representing a target linework image area with respect to each scanning line in a primary scanning direction, said target linework image area being specified to have a predetermined color;

(b) specifying shift parameters indicating a gradient of a shift of said target linework image area and a range of said shift in a secondary scanning direction;

(c) selecting a target primary scanning line to be processed in order of a secondary scanning coordinate of each primary scanning line;

(d) reading out a set of said run length data from said first memory, said set of said run length data representing a linework image on said target primary scanning line;

(e) extracting effective run length data from said set of said run length data, said effective run length data representing a target line segment having said predetermined color;

(f) registering said effective run length data in a second memory, each data record of said effective run length data including a start position and a length of said target line segment and an ordinal number for said data record, said ordinal number being set at an initial value when said effective run length data is memorized in said second memory;

(g) producing supplementary line data representing a supplementary line segment on said target primary scanning line by rounding values of each data record in said effective run length data to the nearest whole number; wherein said step (g) comprises the steps of:

(g-1) finding an end position indicated by said start position and said run length of said each data record of said effective run length data;

(g-2) rounding values of said start position and said end position for said each data record of said effective run length data; and (g-3) producing said supplementary line data representing said supplementary line segment, said supplementary line segment ranging from said rounded start position to said rounded end position;

(h) adding said gradient of said shift to said start position of each data record of said effective run length data, and increasing said ordinal number of said each data record by one, whereby said target line segment is virtually shifted to a next primary scanning line according to said gradient;

(i) eliminating a data record having said ordinal number greater than a sum of said initial value and said range of said shift from said second memory; and (j) repeating said steps (c) through (i) to thereby produce supplementary area data representing said supplementary area including a plurality of said supplementary line segments.

* * * * *